(12) United States Patent (10) Patent No.: US 8,452,250 B2
Ishikawa et al. (45) Date of Patent: May 28, 2013

(54) DC OFFSET COMPENSATION METHOD AND DC OFFSET COMPENSATION DEVICE

(75) Inventors: Hiroyoshi Ishikawa, Kawasaki (JP); Nobukazu Fudaba, Kawasaki (JP); Kazuo Nagatani, Kawasaki (JP); Hajime Hamada, Kawasaki (JP); Tokuro Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 11/819,984

(22) Filed: Jun. 29, 2007

(65) Prior Publication Data

US 2007/0281655 A1 Dec. 6, 2007

Related U.S. Application Data

(63) Continuation of application No. PCT/JP2005/000002, filed on Jan. 4, 2005.

(51) Int. Cl.
*H04B 1/30* (2006.01)

(52) U.S. Cl.
USPC ....... 455/296; 455/114.3; 455/126; 455/63.1; 455/63.13; 375/295; 375/296; 375/297; 375/149; 330/149

(58) Field of Classification Search
USPC ............ 455/114.2, 114.3, 63.1, 67.11, 67.13, 455/126.1, 501, 295, 296, 278.1, 283, 126, 455/108, 110, 113, 115.1–115.3, 127.1, 127.2, 455/91, 63.13; 375/294, 295, 296, 297, 284, 375/285, 254, 278, 149; 330/110, 149, 151, 330/259, 276, 86
See application file for complete search history.

(56) References Cited

U.S. PATENT DOCUMENTS

| | | | |
|---|---|---|---|
| 5,903,823 A | 5/1999 | Moriyama | |
| 6,081,698 A | 6/2000 | Moriyama | |
| 6,091,941 A | 7/2000 | Moriyama | |
| 6,141,390 A | 10/2000 | Cova | |
| 6,275,685 B1 * | 8/2001 | Wessel et al. | 455/126 |
| 6,400,774 B1 * | 6/2002 | Matsuoka et al. | 375/295 |
| 6,600,792 B2 * | 7/2003 | Antonio et al. | 375/297 |
| 6,618,096 B1 * | 9/2003 | Stapleton | 348/608 |
| 6,766,151 B2 * | 7/2004 | Kusunoki | 455/114.3 |

(Continued)

FOREIGN PATENT DOCUMENTS

| | | |
|---|---|---|
| JP | 04275708 | 10/1992 |
| JP | 90-83587 A | 3/1997 |

(Continued)

OTHER PUBLICATIONS

Korean Office Action issued in 2007-7014411 dated Jan. 29, 2009.

(Continued)

*Primary Examiner* — Junpeng Chen
(74) *Attorney, Agent, or Firm* — Smith, Gambrell & Russell, LLP

(57) ABSTRACT

A DC offset component that occurs in a quadrature modulation system, and that is contained in a modulated transmit signal, is compensated for with good accuracy. In a DC offset compensation method according to the present invention, a DC offset correction value obtained from the transmit signal is weighted in accordance with the signal level of an input signal which is transmit data input to the quadrature modulation system, and the DC offset component contained in the transmit signal is compensated for by using the thus weighted DC offset correction value.

25 Claims, 34 Drawing Sheets

U.S. PATENT DOCUMENTS

| | | | | |
|---|---|---|---|---|
| 6,909,756 | B1* | 6/2005 | Nakajima | 375/296 |
| 7,020,447 | B2* | 3/2006 | Nagatani et al. | 455/114.3 |
| 7,248,643 | B2* | 7/2007 | Takabayashi et al. | 375/296 |
| 7,257,379 | B2* | 8/2007 | Ozluturk et al. | 455/73 |
| 7,496,152 | B2* | 2/2009 | Nagatani et al. | 375/296 |
| 7,551,905 | B2* | 6/2009 | Kubo et al. | 455/126 |
| 7,577,211 | B2* | 8/2009 | Braithwaite | 375/296 |
| 2002/0097811 | A1* | 7/2002 | Kubo et al. | 375/296 |
| 2002/0101938 | A1* | 8/2002 | Horaguchi et al. | 375/297 |
| 2004/0032296 | A1* | 2/2004 | Akaiwa | 330/149 |
| 2004/0082305 | A1 | 4/2004 | Kirschenmann | |
| 2004/0248516 | A1* | 12/2004 | Demir et al. | 455/63.1 |
| 2005/0111525 | A1* | 5/2005 | Driesen et al. | 375/147 |
| 2006/0083330 | A1 | 4/2006 | Nagato | |

FOREIGN PATENT DOCUMENTS

| | | |
|---|---|---|
| JP | 983587 | 3/1997 |
| JP | 09083587 | 3/1997 |
| JP | 09083587 A * | 3/1997 |
| JP | 10-79693 A | 3/1998 |
| JP | 10-136048 A | 5/1998 |
| JP | 2001203772 | 7/2001 |
| JP | 2001-23723 A | 8/2001 |
| JP | 2001-267850 A | 9/2001 |
| JP | 2002-077285 A | 3/2002 |
| JP | 2002077285 | 3/2002 |
| WO | 2004055976 | 7/2004 |
| WO | 2004055976 A1 | 7/2004 |

OTHER PUBLICATIONS

Supplemental European Search Report dated Mar. 5, 2009.

Lars Sundstrom et al: "Quantization Analysis and Design of a Digital Predistortion Linearizer for RF Power Amplifiers" IEEE Transactions on Vehicular Technology, IEEE Service Center, Piscataway, NJ, US, vol. 45, No. 4, Nov. 1, 1996, XP011063529 ISSN: 0018-9545 * pp. 707-709; figures 1,3,5,6 *.

Korean Office Action dated May 27, 2008 with English Translation issued in corresponding Korean Application No. 10-2007-7014411.

Office Action mailed on Sep. 29, 2009, for the Japanese patent application No. 2006-550550.

Summons to Attend Oral Proceedings Pursuant to Rule 115(1) EPC dated Mar. 25, 2010 received in corresponding European Patent Application No. 05719049.8-2206/1835626.

* cited by examiner

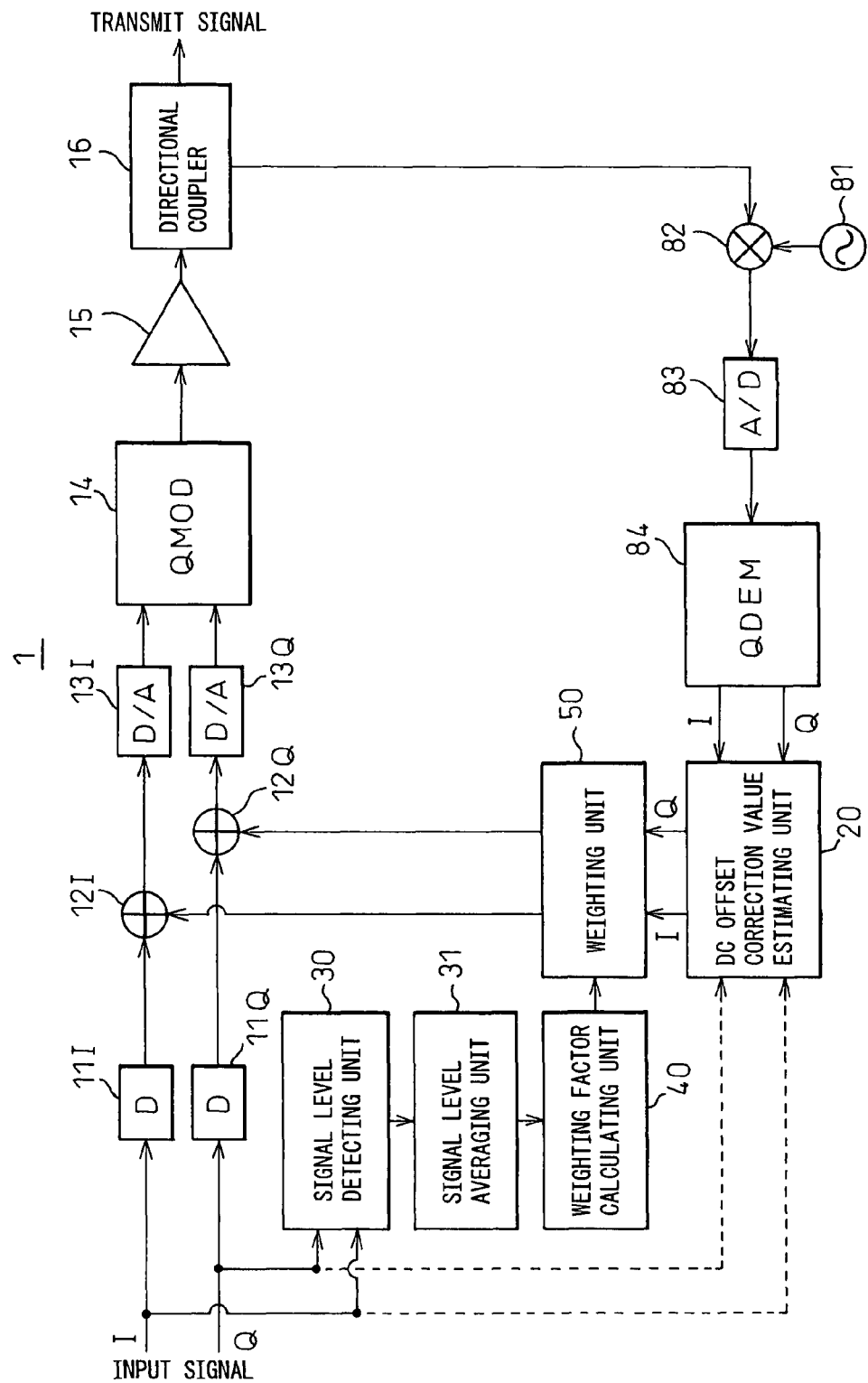

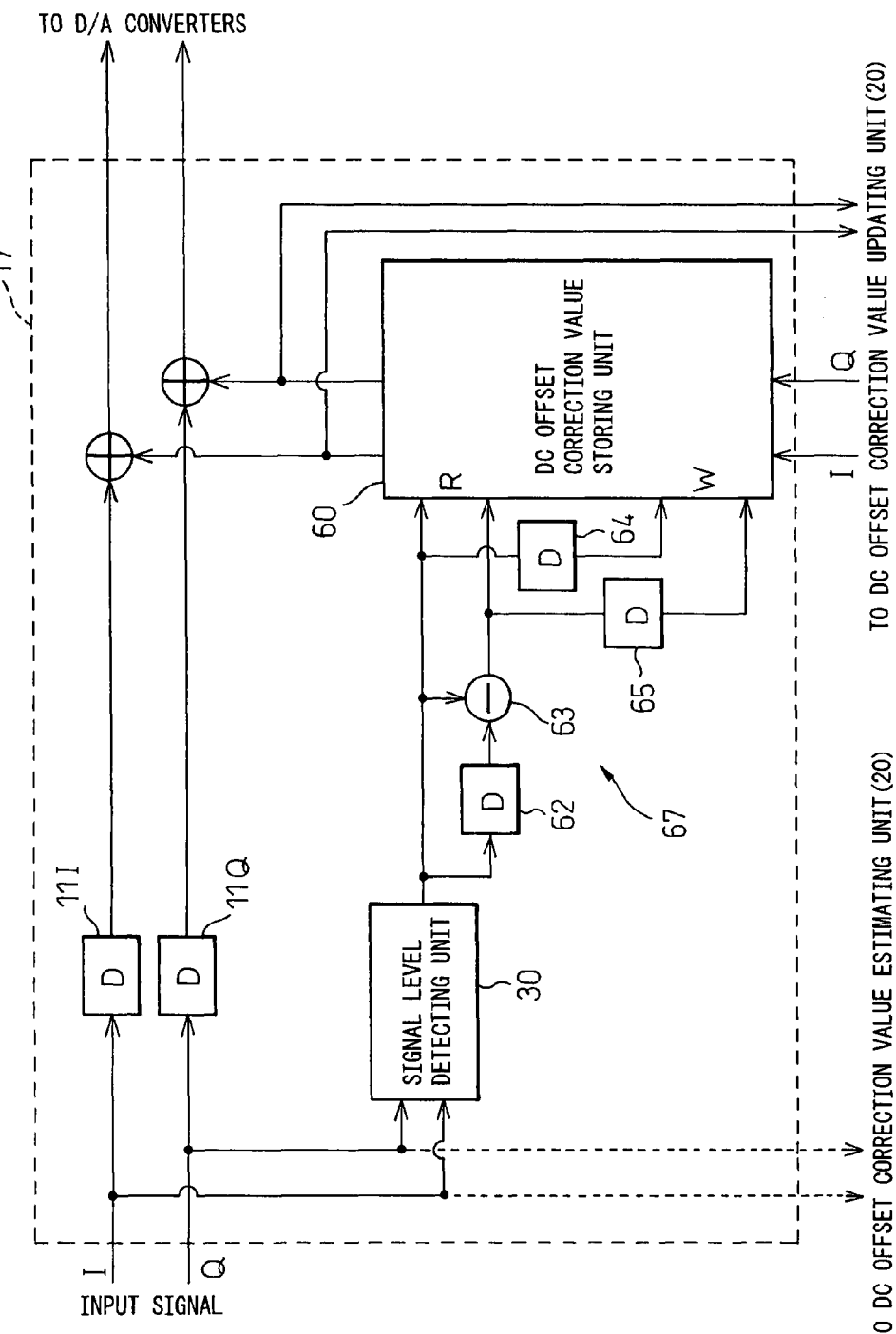

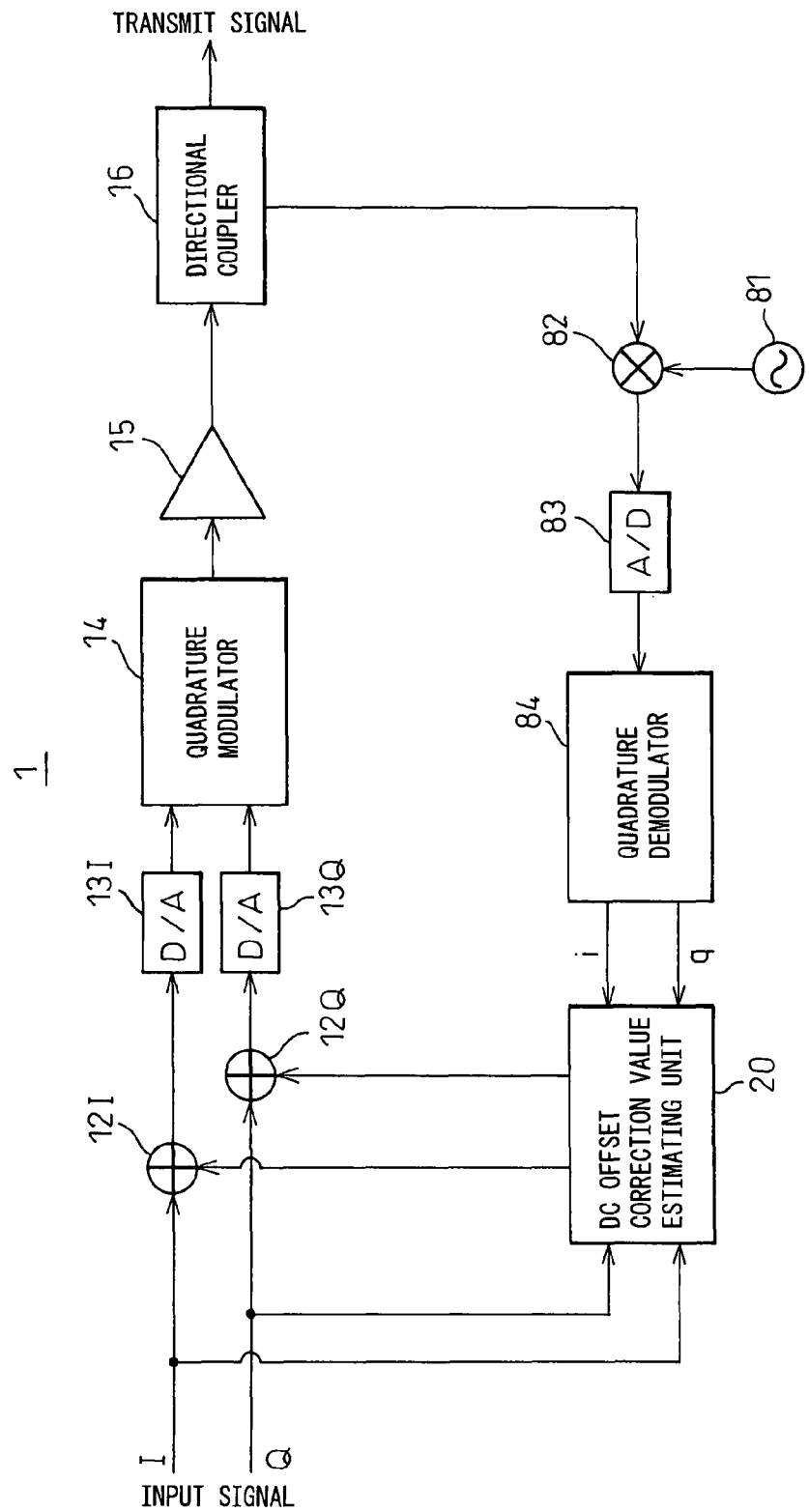

DC OFFSET COMPENSATION METHOD AND DC OFFSET COMPENSATION DEVICE

CROSS-REFERENCE TO RELATED APPLICATION

This application is a continuation application and is based upon PCT/JP2005/00002, filed on Jan. 4, 2005. TECHNICAL FIELD. The Substitute Specification contains no new matter.

The present invention relates generally to quadrature modulation in which a transmit signal is produced by modulating two quadrature carriers in accordance with an input signal comprising an in-phase component signal and a quadrature component signal, and more particularly to a DC offset compensation method and DC offset compensation device for compensating for a DC offset contained in the transmit signal. More specifically, the invention relates to a DC offset compensation method and DC offset compensation device which performs the DC offset compensation by using a DC offset correction value obtained from the transmit signal.

BACKGROUND ART

A quadrature modulation system, which produces a transmit signal by modulating two quadrature carriers in accordance with an input signal comprising an in-phase component signal and a quadrature component signal, can flexibly achieve a variety of modulation schemes and signal constellations, and is therefore employed in many communication apparatuses and electronic appliances.

FIG. 33 is a diagram schematically showing the configuration of such a quadrature modulation system. The input signal to the quadrature modulation system 1, which is transmit data such as a complex baseband signal, is made up of an in-phase component signal and a quadrature component signal, and they are input to the quadrature modulation system 1 via an I channel and a Q channel respectively corresponding to the two carriers.

These input signal components are converted by D/A converters 13I and 13Q, provided in the I and Q channels respectively, into analog signals for the respective channels. Then, the transmit signal is formed by modulating the two carriers with the respective analog signals in a quadrature modulator 14, and the thus formed transmit signal is fed via a power amplifier 15 to an antenna (not shown) for transmission.

In such a quadrature modulation system, when frequency-converting the transmit signal, i.e., the complex baseband signal, by the analog quadrature modulator (QMOD), a DC offset may be added to the transmit signal in analog device circuits in the quadrature modulation system as a whole, for example, in the analog device circuits between the quadrature modulator 14 and the digital/analog converters 13I and 13Q (hereinafter called the "D/A converters"), due to differences or variations in the characteristics of multiplier circuits in the analog domain.

This DC offset manifests itself as a carrier leakage (unwanted carrier) in the frequency-converted analog transmit signal, causing an adjacent channel leakage and thus leading to a degradation of the transmit signal quality.

In one method practiced in the prior art to compensate for the DC offset, a component inverse in polarity to the DC offset expected to be added during the process between the D/A converters 13I and 13Q and the quadrature modulator 14 is added in advance to the transmit signal before input to the D/A converters 13I and 13Q, thereby canceling out the DC offset.

To generate such a DC offset canceling signal, there is proposed a method in which a portion of the quadrature-modulated transmit signal is fed back and the feedback signal is analyzed to measure and correct the DC offset (refer, for example, to patent document 1 listed below), and also a method in which the transmit signal is subtracted from the feedback signal to extract an error component and then the DC offset is measured and corrected.

FIG. 34 is a diagram showing a configuration example of a quadrature modulation system in which the offset compensation is performed by generating a DC offset canceling signal. In this configuration example, the transmit signal is subtracted from the feedback signal to extract an error component, and then the DC offset is measured and corrected.

For this purpose, a directional coupler 16 is inserted between the power amplifier 15 and the antenna (not shown), and a portion of the transmit signal is fed back through a monitor terminal of the directional coupler 16. The transmit signal thus fed back is passed through a mixer 82, an analog/digital converter (hereinafter called the "A/D converter") 83, and a quadrature demodulator 84 to generate quadrature monitored signals i and q, which are supplied to a DC offset correction value estimating unit 20.

Then, based on these quadrature monitored signals i and q and the earlier described input signal components, the DC offset correction value estimating unit 20 estimates DC offset correction values for compensating for the DC offset for the in-phase and quadrature components, respectively.

The DC offset correction values thus estimated are added by adders 12I and 12Q respectively to the in-phase and quadrature input signal components before input to the respective D/A converters.

An output signal of an oscillator 81 is input to the mixer 82 through its local oscillator input terminal, and the transmit signal separated by the directional coupler 16 is mixed with the local oscillator signal for frequency conversion to produce an intermediate frequency signal.

The A/D converter 83 converts the intermediate frequency signal into a digital signal that is synchronized to a clock signal of a given frequency.

The quadrature demodulator 84 quadrature-demodulates the digital signal to produce the quadrature monitored signals i and q corresponding to the I and Q channels, respectively, that are in phase quadrature to each other.

The DC offset correction value estimating unit 20 obtains offset components contained in the quadrature monitored signals i and q, for example, by smoothing these signals in the complex plane. Likewise, the DC offset correction value estimating unit 20 obtains offset components contained in the in-phase and quadrature input signal components by smoothing them in the complex plane.

Then, the DC offset correction value estimating unit 20 extracts only the offset component added in the quadrature modulation system 1 by subtracting the in-phase signal component in the quadrature monitored signal i and the quadrature signal component in the quadrature monitored signal q from the respective input signal components I and Q, and estimate the inverse offset obtained by inverting the sign of the offset component as the DC offset correction value.

Patent document 1: Japanese Unexamined Patent Publication No. H10-79692

Patent document 2: Japanese Unexamined Patent Publication No. 2001-237723

DISCLOSURE OF THE INVENTION

Problem to be Solved by the Invention

As described above, the DC offset occurs due to differences or variations in the characteristics of the multiplier circuits in the analog domain in the quadrature modulation system as a whole. Accordingly, the amount of offset may vary according to the input modulating signal.

However, the above-described prior art DC offset compensation method, which generates the DC offset correction value by smoothing the feedback signal, has had the problem that a variation in the input signal is not reflected in the DC offset correction value and, therefore, compensation for the DC offset cannot be performed with good accuracy.

In view of the above problem, it is an object of the present invention to achieve quadrature modulation in which the DC offset contained in the transmit signal can be compensated for with good accuracy.

Means for Solving the Problem

In quadrature modulation which produces a transmit signal by modulating two quadrature carriers in accordance with an input signal comprising an in-phase component signal and a quadrature component signal, the present inventors have discovered that the DC offset contained in the transmit signal varies with the signal level of the input signal, and have conceived of the invention based on this discovery.

In the present invention, as will be described in detail later with reference to drawings, a DC offset correction value is obtained from the transmit signal and is weighted in accordance with the signal level of the input signal, and the DC offset is compensated for by using the thus weighted DC offset correction value.

In the present invention, the DC offset correction value is stored for each signal level of the input signal. Then, the stored DC offset correction value is retrieved based on the signal level of the input signal, and the DC offset is compensated for by using the thus retrieved DC offset correction value.

Further, in the present invention, an approximation equation is determined which is used to calculate from each signal level of the input signal the DC offset correction value corresponding to that signal level and, using this approximation equation, the DC offset correction value that matches the signal level of the input signal is calculated, and the DC offset is compensated for by using the thus calculated DC offset correction value.

In this way, by weighting or varying the DC offset correction value in accordance with the signal level of the input signal, the effect that the variation of the input signal has on the offset is reflected in the correction value so that the DC offset can be compensated for with good accuracy.

BRIEF DESCRIPTION OF THE DRAWINGS

FIG. 9 is a diagram schematically showing the configuration of a quadrature modulation system according to a second embodiment of the present invention.

FIG. 31 is a diagram schematically showing the configuration of a portion (17) of FIG. 29.

FIG. 34 is a diagram showing a configuration example of a quadrature modulation system in which offset compensation is performed by generating a DC offset canceling signal.

DESCRIPTION OF THE REFERENCE NUMERALS

10. QUADRATURE MODULATING UNIT
20. DC OFFSET CORRECTION VALUE ESTIMATING UNIT
30. SIGNAL LEVEL DETECTING UNIT
40. WEIGHTING FACTOR CALCULATING UNIT
50. WEIGHTING UNIT
60. DC OFFSET CORRECTION VALUE STORING UNIT
70. DC OFFSET CORRECTION VALUE CALCULATING UNIT

BEST MODE FOR CARRYING OUT THE INVENTION

Figure 1:
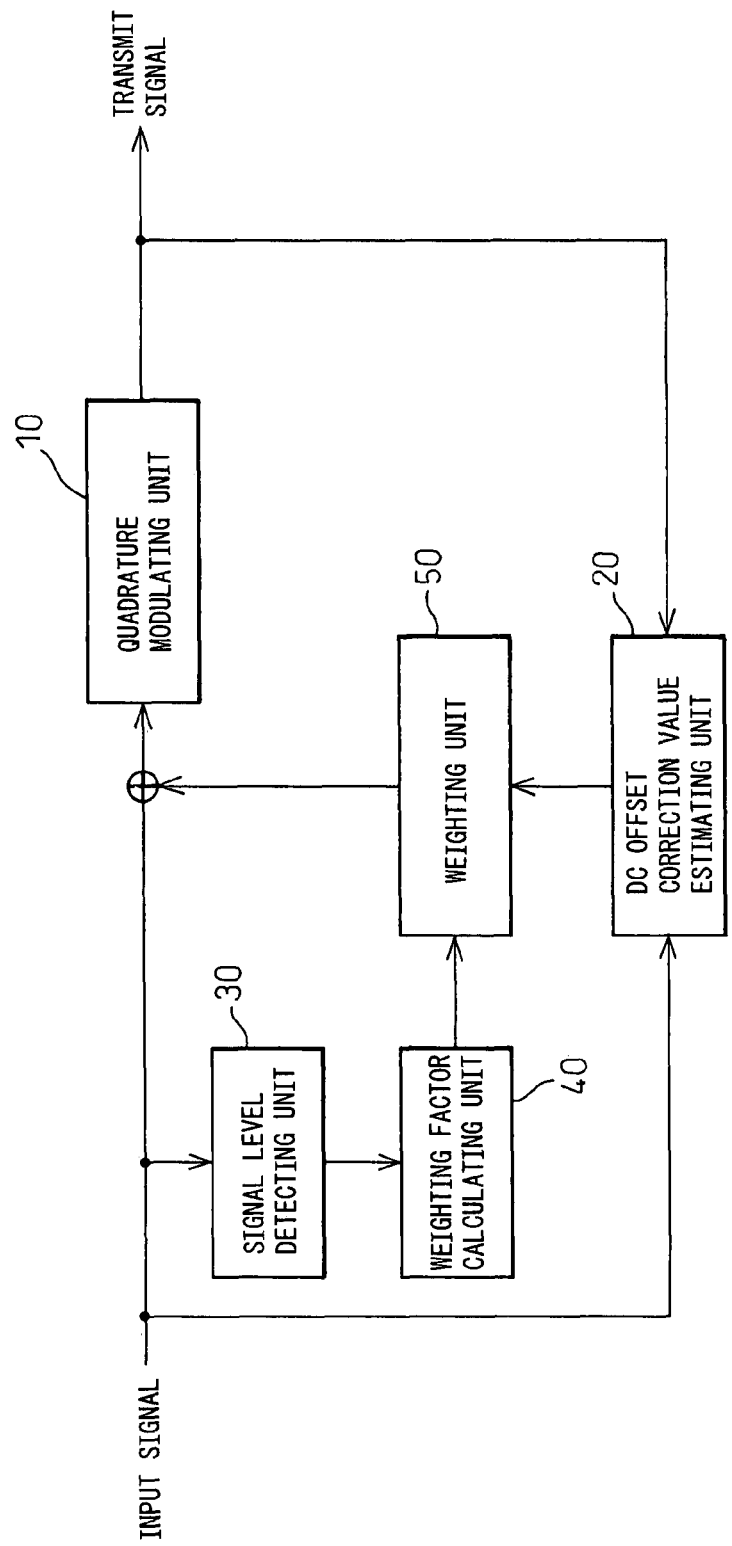
FIG. 1 is a diagram showing a first basic configuration of the present invention.

The basic configuration of the present invention will be described below. FIG. 1 is a diagram showing a first basic configuration of the present invention. As shown, a DC offset compensation device according to the present invention comprises: a DC offset correction value estimating unit 20 which estimates a DC offset correction value based on a transmit signal that is produced by a quadrature modulating unit 10 by modulating two quadrature carriers in accordance with an input signal comprising an in-phase component signal and a quadrature component signal; a signal level detecting unit 30 which detects the signal level of the input signal; a weighting factor calculating unit 40 which calculates a weighting factor for weighting the DC offset correction value in accordance with the signal level; and a weighting unit 50 which assigns a weight to the DC offset correction value in accordance with the weighting factor. The DC offset contained in the transmit signal is compensated for by using the thus weighted DC offset correction value.

Figure 2:
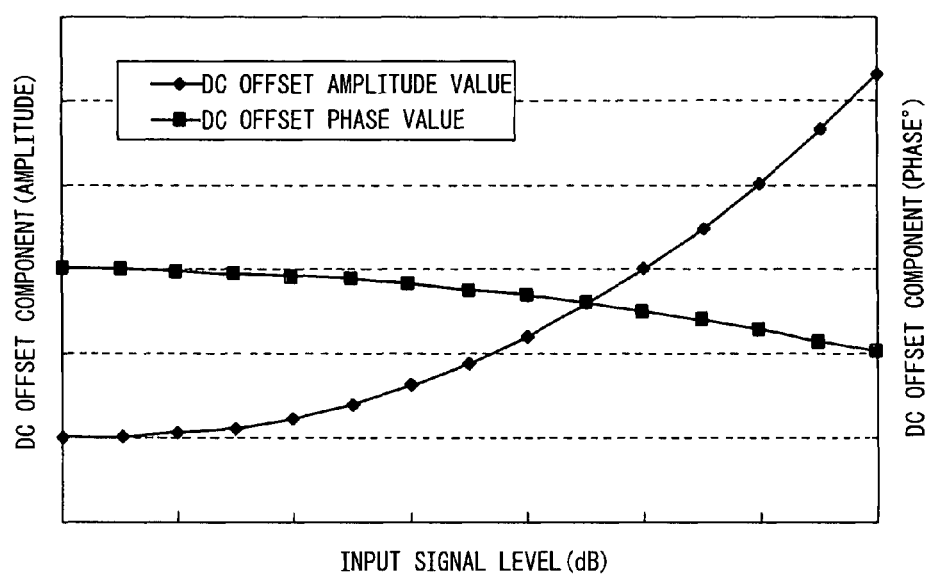
FIG. 2 is a graph showing the characteristics of a DC offset as a function of input signal level.
Figure 33:
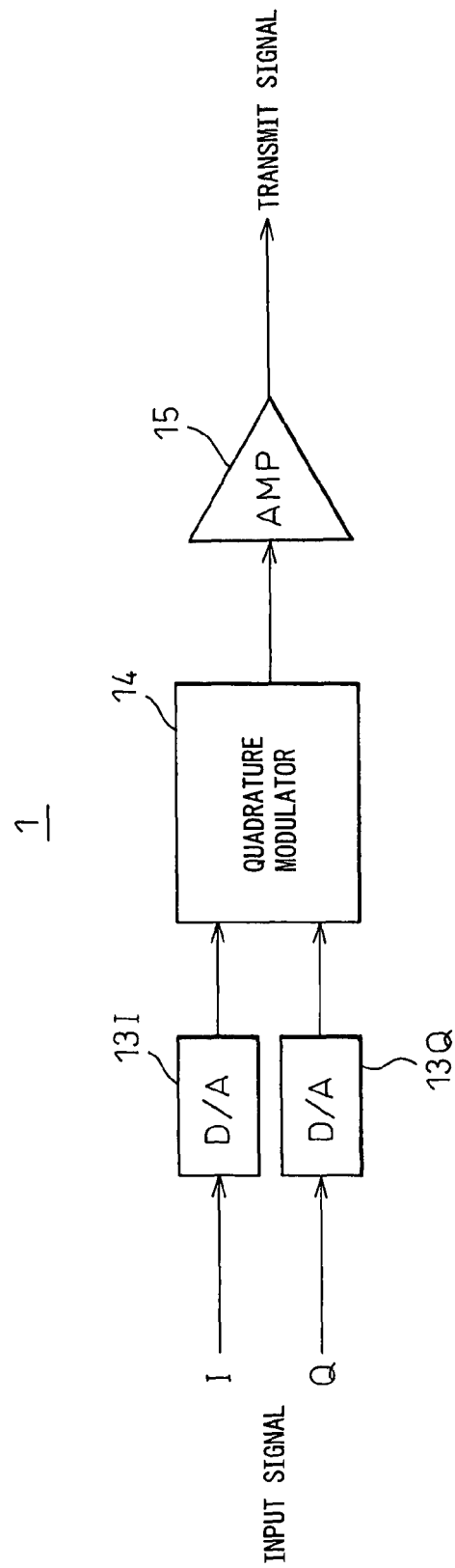
FIG. 33 is a diagram schematically showing a configuration example of a quadrature modulation system.

FIG. 2 shows the characteristics of the DC offset contained in the modulated transmit signal versus the level of the input signal to the quadrature modulation system that have been found experimentally by the present inventors. As shown, the DC offset contained in the quadrature-modulated transmit signal varies with the signal level of the input signal with which the carriers are modulated. It is believed that such a phenomenon occurs because variations in the input signal level cause variations in the operating environment of the analog circuits such as the D/A converters 13I and 13Q previously shown in FIGS. 33 and 34.

In view of this, in the basic configuration shown in FIG. 1, the DC offset correction value for compensating for the DC offset is weighted in accordance with the signal level of the input signal so that the DC offset varying with the signal level of the input signal can be compensated for with good accuracy.

Figure 3:
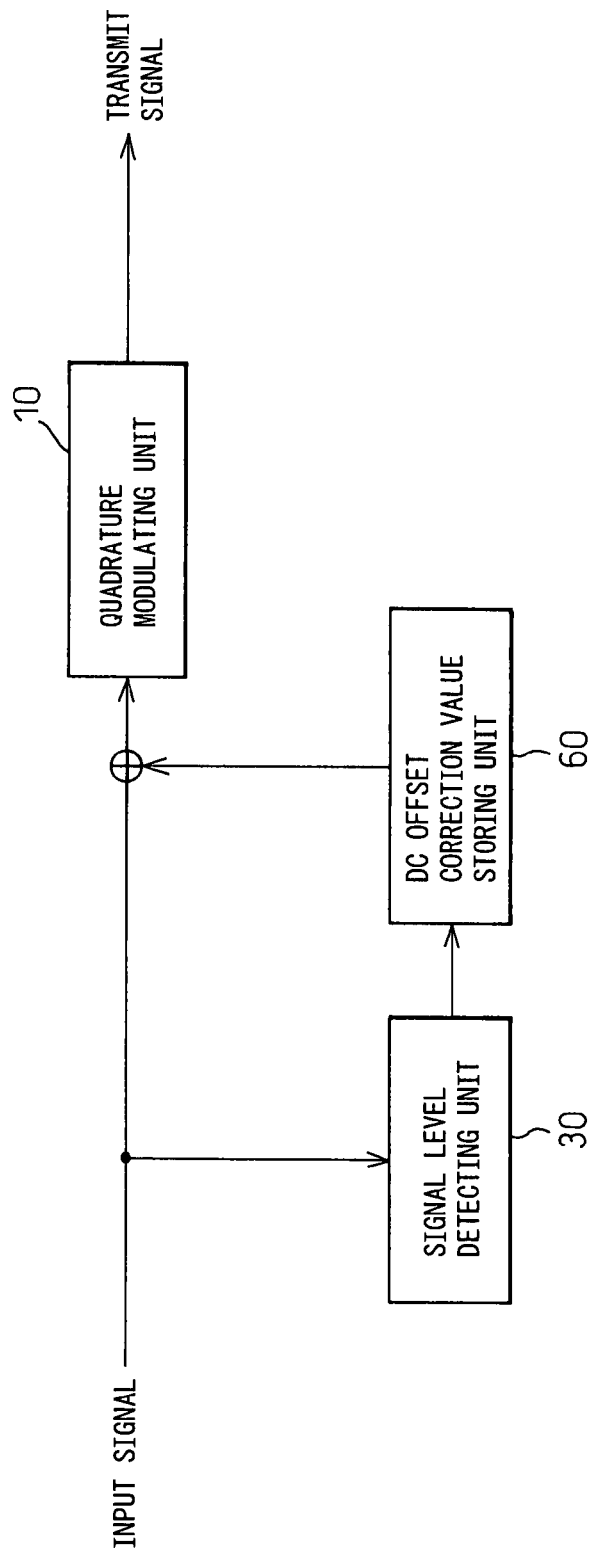
FIG. 3 is a diagram showing a second basic configuration of the present invention.

FIG. 3 is a diagram showing a second basic configuration of the present invention. As shown, a DC offset compensation device according to the present invention comprises a signal level detecting unit 30 which detects the signal level of the input signal and a DC offset correction value storing unit 60 which stores DC offset correction values for various input signal levels, and the DC offset contained in the transmit signal is compensated for by using the DC offset correction value retrieved based on the signal level of the input signal. In this configuration also, by varying the DC offset correction value in accordance with the signal level of the input signal, the DC offset can be compensated for with good accuracy.

Figure 4:
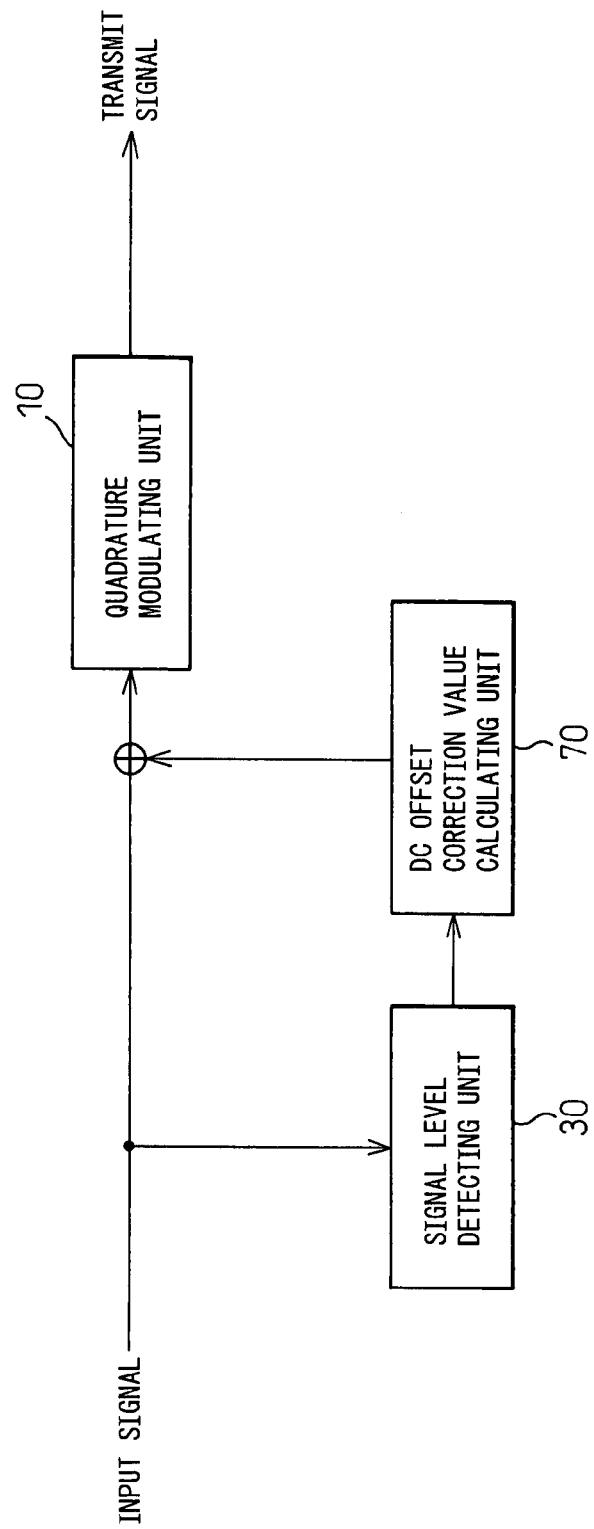
FIG. 4 is a diagram showing a third basic configuration of the present invention.

FIG. 4 is a diagram showing a third basic configuration of the present invention. As shown, a DC offset compensation device according to the present invention comprises a signal level detecting unit 30 which detects the signal level of the input signal and a DC offset correction value calculating unit 70 which calculates the DC offset correction value in accordance with the signal level by using a prescribed approximation equation, and the DC offset contained in the transmit signal is compensated for by using the DC offset correction value calculated in accordance with the signal level of the input signal. In this configuration also, by varying the DC offset correction value in accordance with the signal level of the input signal, the DC offset can be compensated for with good accuracy.

Figure 5:
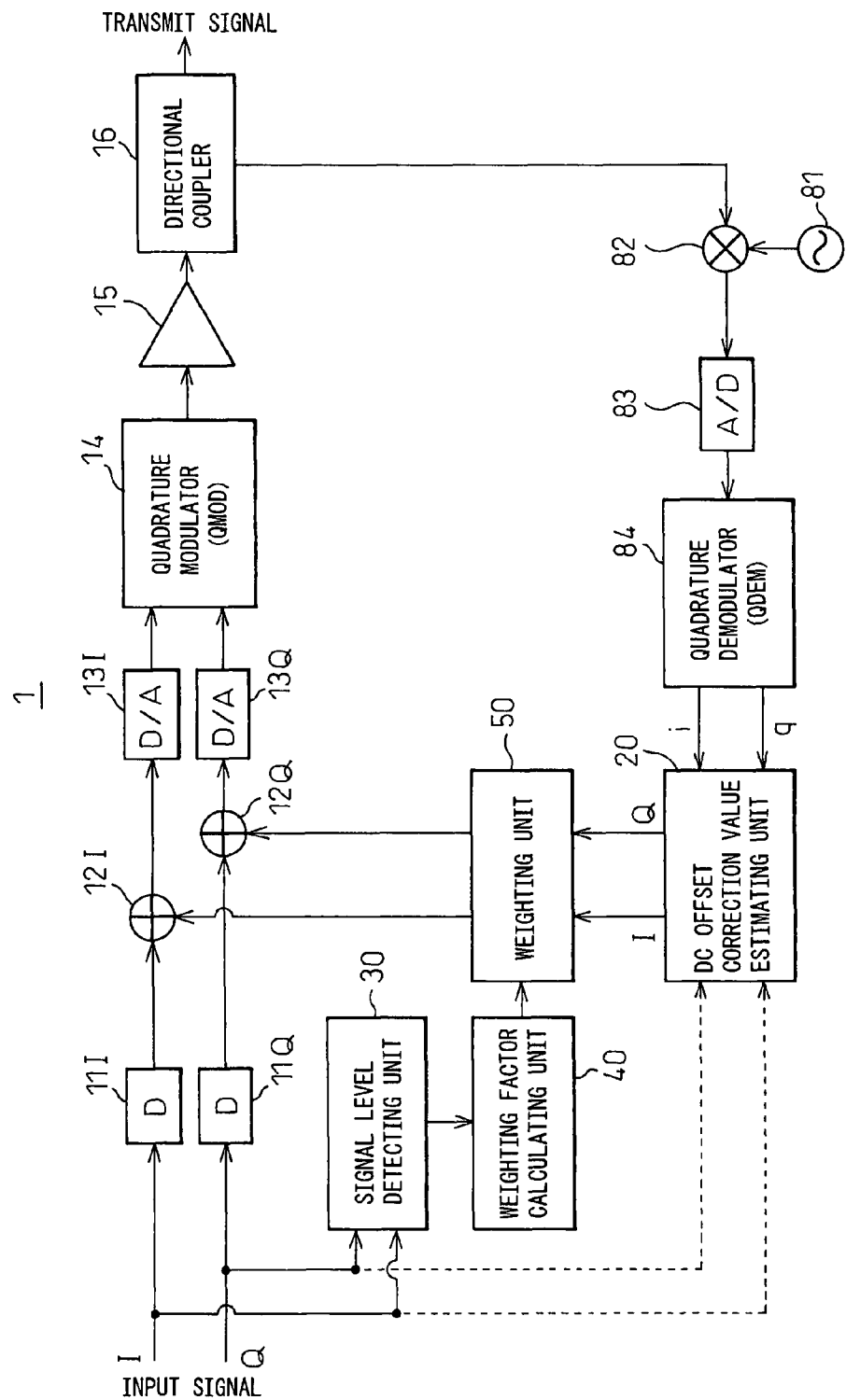
FIG. 5 is a diagram schematically showing the configuration of a quadrature modulation system according to a first embodiment of the present invention.

Embodiments of the present invention will be described below with reference to the accompanying drawings. FIG. 5 is a diagram schematically showing the configuration of a quadrature modulation system according to a first embodiment of the present invention.

The quadrature modulation system 1 receives transmit data, for example, a complex baseband signal or the like, as an input signal, and modulates two quadrature carriers with the input signal to produce a modulated signal for transmission.

The input signal is made up of an in-phase component signal and a quadrature component signal, which are input to the quadrature modulation system 1 via an I channel and a Q channel respectively corresponding to the two carriers.

These input signal components are converted by D/A converters 13I and 13Q, provided in the I and Q channels respectively, into analog signals for the respective channels. Then, a quadrature modulator 14 modulates the two carriers with the respective analog signals to produce the transmit signal (modulated signal). This transmit signal is fed via a power amplifier 15 to an antenna (not shown) for transmission.

A directional coupler 16 is connected between the output of the power amplifier 15 and the antenna (not shown), and the directional coupler 16 separates a portion of the transmit signal through its monitor terminal and supplies it to a mixer 82.

In the mixer 82, the transmit signal supplied via the directional coupler 16 is mixed with a local oscillator signal from an oscillator 81 for frequency conversion to produce an intermediate frequency signal, which is input to an A/D converter 83.

The A/D converter 83 converts the intermediate frequency signal into a digital signal that is synchronized to a clock signal of a given frequency (not shown).

A quadrature demodulator 84 quadrature-demodulates the digital signal to produce quadrature monitored signals i and q corresponding to the I and Q channels, respectively, that are in phase quadrature to each other.

Then, based on this feedback signal, the DC offset correction value estimating unit 20 estimates the DC offset correction value for compensating for the DC offset.

To simplify the explanation of the DC offset correction value estimating unit 20 given hereinafter, the section leading from the inputs of the respective D/A converters 13I and 13Q to the power amplifier 15 will be referred to as the "forward line," and the section leading from the monitor terminal of the directional coupler 16 to the input of the A/D converter 83 will be referred to as the "feedback line."

Figure 6:
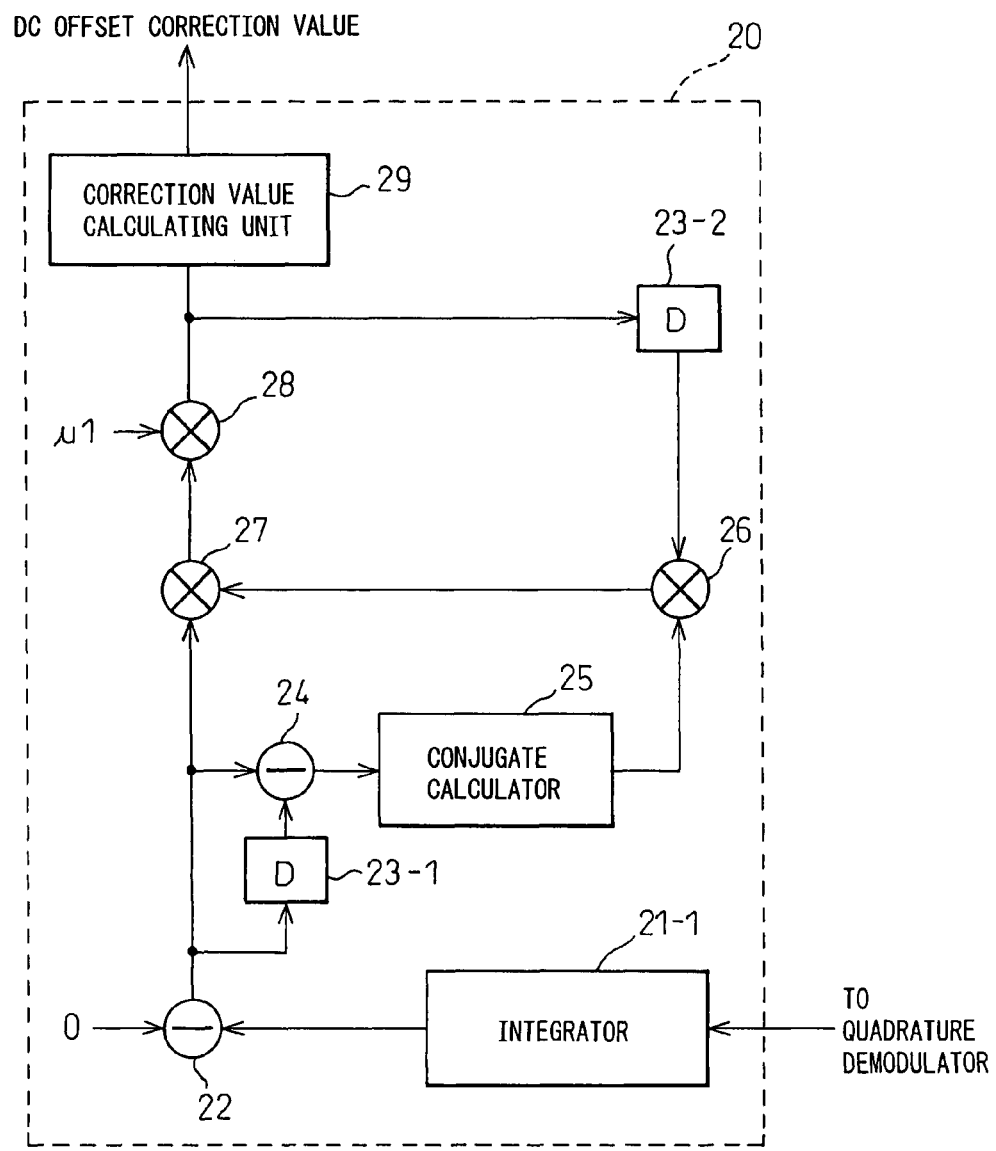
FIG. 6 is a diagram (part 1) showing the configuration of a DC offset correction value estimating unit shown in FIG. 5.

FIG. 6 is a diagram schematically showing the configuration of the DC offset correction value estimating unit 20.

As shown, the DC offset correction value estimating unit 20 comprises: an integrator 21-1 which smoothes the quadrature monitored signals i and q individually in the complex plane; a subtractor 22 one input of which is connected to the output of the integrator 21-1 and the other input of which is set to "0" which is the target value of the offset component to be compensated for; a delay element 23-1 to which an output of the subtractor 22 is supplied; a subtractor 24 one input of which is connected to the output of the subtractor 22 and the other input of which is connected to the output of the delay element 23-1; a conjugate calculator 25 cascaded with the output of the subtractor 24; a multiplier 26 one input of which is connected to the output of the conjugate calculator 25; a multiplier 27 one input of which is connected to the output of the subtractor 22 and the other input of which is connected to the output of the multiplier 26; a multiplier 28 one input of which is connected to the output of the multiplier 27 and the other input of which is supplied with a step size µ1; a delay element 23-2 via which the output of the multiplier 28 is connected to the other input of the multiplier 26; and a correction value calculating unit 29 which calculates an offset correction value vector from the output of the multiplier 28.

Operation of the thus configured DC offset correction value estimating unit 20 will be described below.

The integrator 21-1 extracts the offset components contained in the quadrature monitored signals i and q by smoothing the respective signals in the complex plane. The subtractor 22 obtains the deviation $Rx_{offset[n]}$ of each offset component relative to the target value "0" in order of time sequence n.

The delay element 23-1 and the subtractor 24 obtain the increment $\delta_{[n]}$ between the thus obtained $Rx_{offset[n]}$ and $Rx_{offset[n-1]}$ ($=Rx_{offset[n]} - Rx_{offset[n-1]}$) in order of time sequence n. The conjugate calculator 25 obtains a conjugate increment $\delta_{[n]}'$ which is the conjugate of the increment $\delta_{[n]}$ in the complex plane.

On the other hand, the delay element 23-2 stores an offset compensation vector $CMP_{[n]}$ and supplies the previously obtained offset compensation vector $CMP_{[n-1]}$ to the multiplier 26. The multiplier 26 obtains the outer product $u_{[n]}$ of this previous offset compensation vector $CMP_{[n-1]}$ and the conjugate increment $\delta_{[n]}'$ in order of time sequence n.

Such an outer product $u_{[n]}$ is mathematically equivalent to the inner product of the offset compensation vector $CMP_{[n-1]}$ and the increment $\delta_{[n]}$; therefore, for simplicity, the outer product is hereinafter simply referred to as the "inner product $u_{[n]}$," and it is assumed that the $e^{j0}$ is set as the initial value $u_{[0]}$.

The multipliers 27 and 28 sequentially update the offset compensation vector $CMP_{[n]}$ to the outer product shown by the equation (1) below for the inner product $u_{[n]}$, the deviation $Rx_{offset[n]}$, and the step size µ1, which is a preset scalar quantity.

$$CMP_{[n]} = -\mu 1 \times Rx_{offset[n]} \times u_{[n]} \qquad (1)$$

The correction value calculating unit 29 updates the offset correction value vector $Tx_{offset[n]}$ to the outer product ($=Tx_{offset[n+1]}$) shown by the equation (2) below for the offset compensation vector $CMP_{[n]}$ given by the multiplier 28 and the offset correction value vector $Tx_{offset[n]}$ which is set based on the offset compensation vector $CMP_{[n-1]}$ preceding the offset compensation vector $CMP_{[n]}$.

$$Tx_{offset[n+1]} = Tx_{offset[n]} + CMP_{[n]} \qquad (2)$$

The DC offset correction value estimating unit 20 supplies the thus calculated DC offset correction value, i.e., the offset correction value vector $Tx_{offset[n]}$, to the adders 12I and 12Q via the weighting unit 50, to be described later.

The adders 12I and 12Q add the in-phase and quadrature components of the offset correction value vector $Tx_{offset[n]}$ to the in-phase and quadrature components of the input signal, respectively, and supply the results to the respective D/A converters 13I and 13Q.

Here, the offset compensation vector $CMP_{[n-1]}$ is a value with which the offset correction value vector $Tx_{offset[n-1]}$ previously applied to the forward line via the correction value calculating unit 29 is to be updated.

Further, the increment $\delta_{[n]}$ indicates the amount of change of the deviation $Rx_{offset[n]}$ that occurs in the feedback line when the offset correction value vector $Tx_{offset[n]}$ is applied to the forward line instead of the previously applied offset correction value vector $Tx_{offset[n-1]}$.

That is, the inner product $u_{[n]}$ of the offset compensation vector $CMP_{[n-1]}$ and the increment $\delta_{[n]}$ corresponds to the cosine value of the sum φ of the phase shifts in the forward and feedback lines, and this value is updated as needed to a value that matches the deviation or variation of the phase shift.

Accordingly, the thus generated offset correction value vector $Tx_{offset[n]}$ is updated so as to minimize the expected value of the product of the deviation $Rx_{offset[n]}$ and the inner product $u_{[n]}$, as shown by the above equations (1) and (2).

Further, the advantage is that the offset correction value vector $Tx_{offset[n]}$ is maintained flexibly and stably at a value that matches the deviation or variation of the phase shift in the feedback line.

Figure 7:
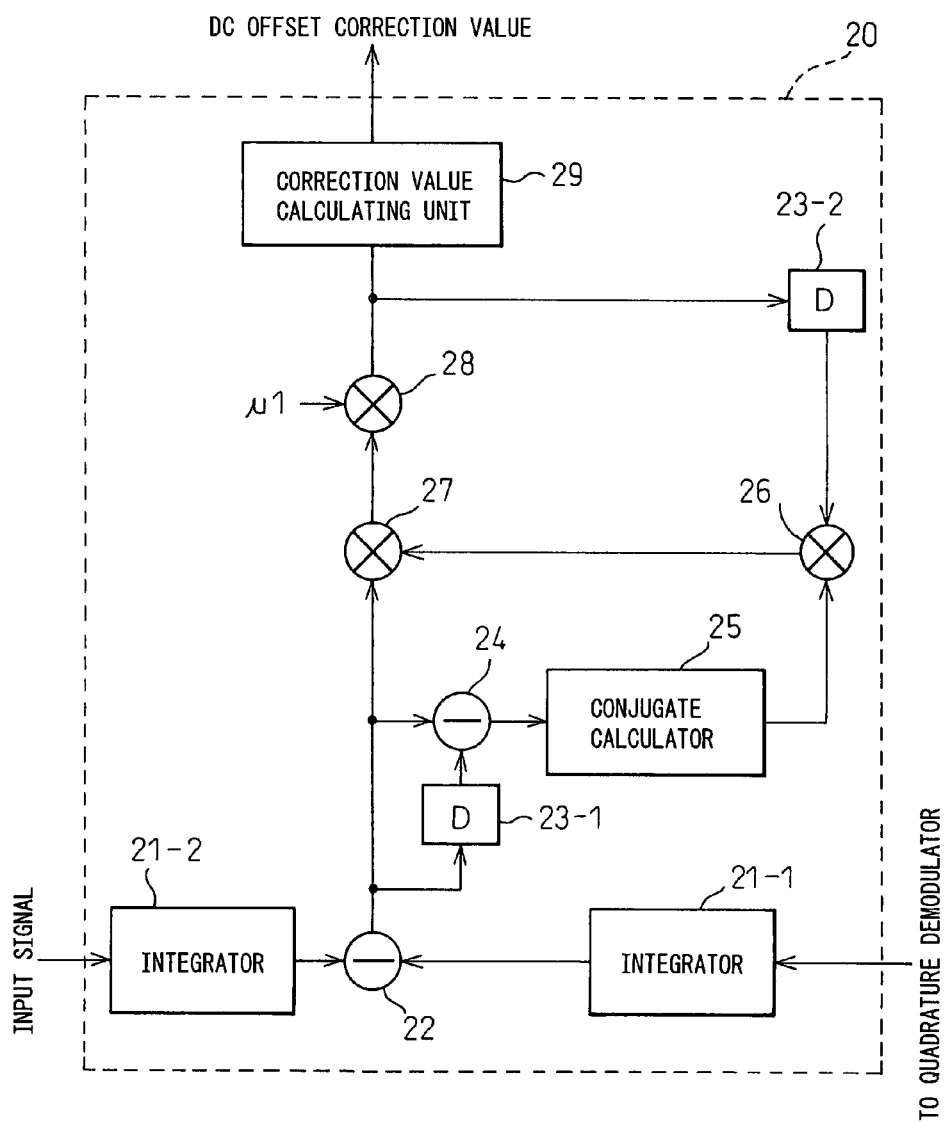
FIG. 7 is a diagram (part 2) showing the configuration of the DC offset correction value estimating unit shown in FIG. 5.

In the DC offset correction value estimating unit 20 shown in FIG. 6, "0" is given as the target value. However, as shown in FIGS. 5 and 7, since the target value is provided by an integrator 21-2 that receives the input signal and detects the DC component contained in the input signal, the DC offset correction value estimating unit 20 can also be applied to a device that generates modulated waves containing residual carrier signal components. In the embodiments hereinafter described, either the configuration shown in FIG. 6 or the one shown in FIG. 7 may be employed for the DC offset correction value estimating unit 20.

Turning back to FIG. 5, the quadrature modulation system 1 includes a signal level detecting unit 30 which detects the signal level (for example, power value or amplitude value) of the input signal, a weighting factor calculating unit 40 which calculates a weighting factor for weighting the offset correction value vector $Tx_{offset[n]}$ (hereinafter simply called the "offset correction value") in accordance with the detected signal level, and a weighting unit 50 which assigns a weight to the DC offset correction value in accordance with the weighting factor.

As earlier described with reference to FIG. 2, the DC offset contained in the quadrature-modulated transmit signal varies with the signal level of the input signal with which the carriers are modulated; therefore, when the DC offset correction value is weighted in accordance with the signal level of the input signal by using the signal level detecting unit 30, weighting factor calculating unit 40, and weighting unit 50, the offset compensation can be performed using a DC offset correction value that is closer to the DC offset contained in the transmit signal than the prior art.

Figure 8A:
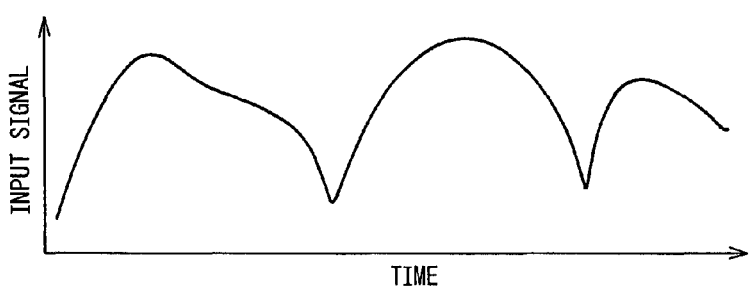
FIG. 8A is a diagram showing the change of the input signal level with time.
Figure 8B:
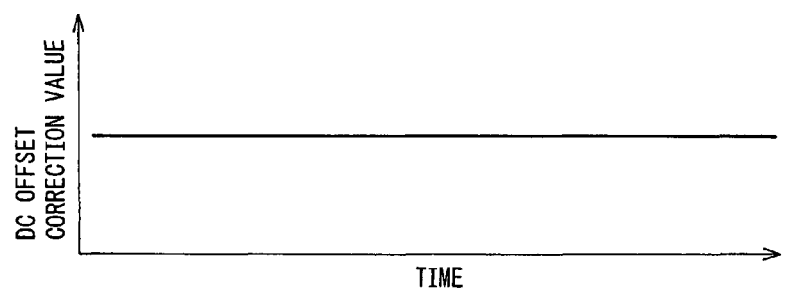
FIG. 8B is a diagram showing the change with time of a DC offset correction value.
Figure 8C:
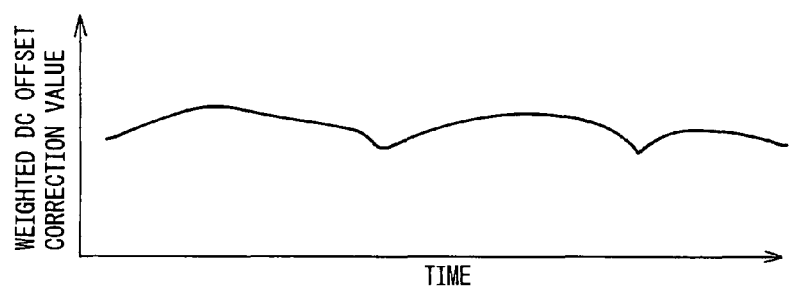
FIG. 8C is a diagram showing the DC offset correction value obtained by weighting the DC offset correction value of FIG. 8B in accordance with the input signal level of FIG. 8A.

FIGS. 8A to 8C are diagrams for explaining how the DC offset correction value is weighted according to the present invention: FIG. 8A is a diagram showing the change of the input signal level with time, FIG. 8B is a diagram showing the change with time of the DC offset correction value estimated by the DC offset correction value estimating unit 20, and FIG. 8C is a diagram showing the DC offset correction value obtained by weighting the DC offset correction value of FIG. 8B in accordance with the input signal level of FIG. 8A.

As described above, the signal level detecting unit 30 detects the signal level which corresponds to the power value or amplitude value of the input signal. When the normal modulating signal is applied as the transmit data, the detected signal level varies with time, as shown in FIG. 8A.

On the other hand, the DC offset correction value estimated by the DC offset correction value estimating unit 20 as earlier described with reference to FIGS. 6 and 7 is obtained by integrating the quadrature monitored signals i and q using the integrator 21-1 and thus averaging these signals over an extended section; as a result, the signal value obtained varies little over time as shown in FIG. 8B.

Therefore, the weighting factor calculating unit 40 shown in FIG. 5 calculates the weighting factor in accordance with the signal level detected as shown in FIG. 8A, and the weighting unit 50 weights the DC offset correction value shown in FIG. 8B in accordance with the weighting factor; that is, the DC offset correction value to be added to the input signal by the adders 12I and 12Q is varied in accordance with the input signal level, as shown in FIG. 8C, and the offset compensation is done using the thus weighted DC offset correction value as the final offset correction value.

Delay elements 11I and 11Q shown in FIG. 5 are provided to delay the input signal by an amount of time required for the signal level detecting unit 30 to detect the input signal level and for the weighting factor calculating unit 40 to calculate the weighting factor in accordance with the signal level.

FIG. 9 is a diagram schematically showing the configuration of a quadrature modulation system according to a second embodiment of the present invention. While the weighting factor calculated by the weighting factor calculating unit 40 can be uniquely determined in accordance with the signal level of the input signal, the DC offset actually contained in the transmit signal may vary for the same input signal level because of unknown transient factors. Accordingly, in the present embodiment, averaging is performed to average the input signal level by reference to which the weighting factor calculating unit 40 calculates the weighting factor, and the DC offset correction value is weighted using the thus smoothed value.

For this purpose, the quadrature modulation system 1 includes, between the signal level detecting unit 30 and the weighting factor calculating unit 40, a signal level averaging unit 31 which averages the input signal level detected by the signal level detecting unit 30 over a prescribed interval (period) and outputs the average value.

Figure 10:
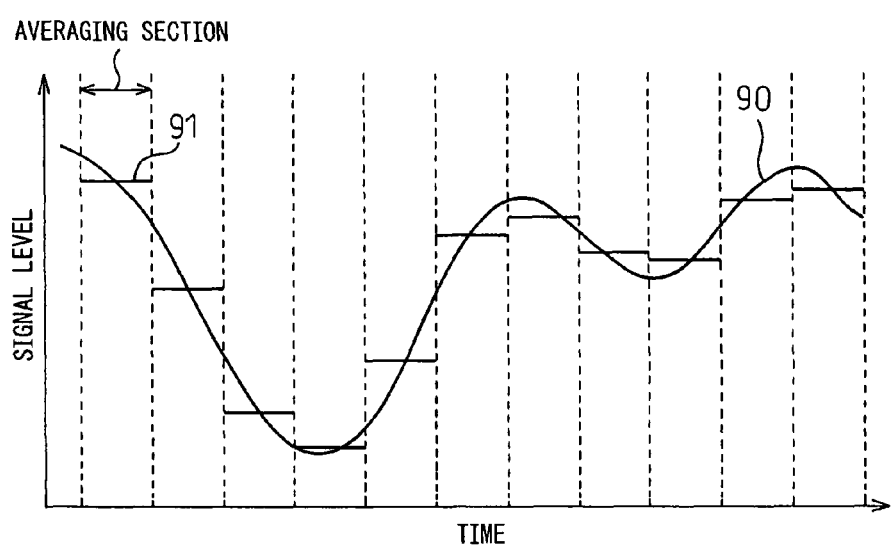
FIG. 10 is a diagram for explaining an averaging of the input signal level.

When the signal level such as shown by a curve 90 in FIG. 10 is supplied from the signal level detecting unit 30, the signal level averaging unit 31 averages the signal level over a given interval and outputs its average value 91 to the weighting factor calculating unit 40.

Figure 11:
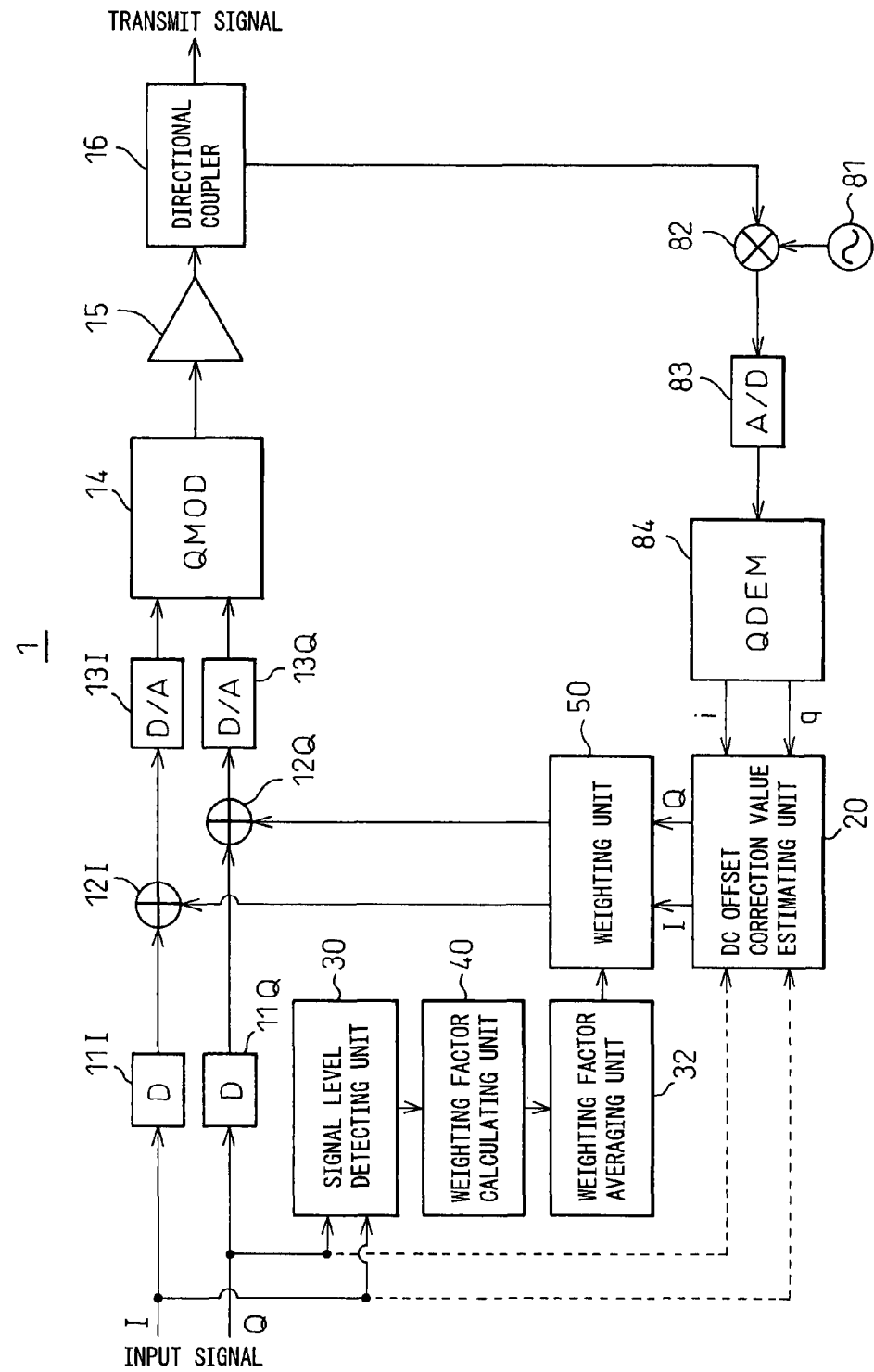
FIG. 11 is a diagram schematically showing the configuration of a quadrature modulation system according to a third embodiment of the present invention.

FIG. 11 is a diagram schematically showing the configuration of a quadrature modulation system according to a third embodiment of the present invention. In this embodiment, instead of performing averaging on the input signal level, the weighting factor being calculated by the weighting factor calculating unit 40 is averaged over a prescribed interval, and the DC offset correction value is weighted in accordance with the average value.

For this purpose, the quadrature modulation system 1 includes, between the weighting factor calculating unit 40 and the weighting unit 50, a weighting factor averaging unit 32 which averages the weighting factor calculated by the weighting factor calculating unit 40 over a prescribed interval (period) and outputs the average value.

Figure 12:
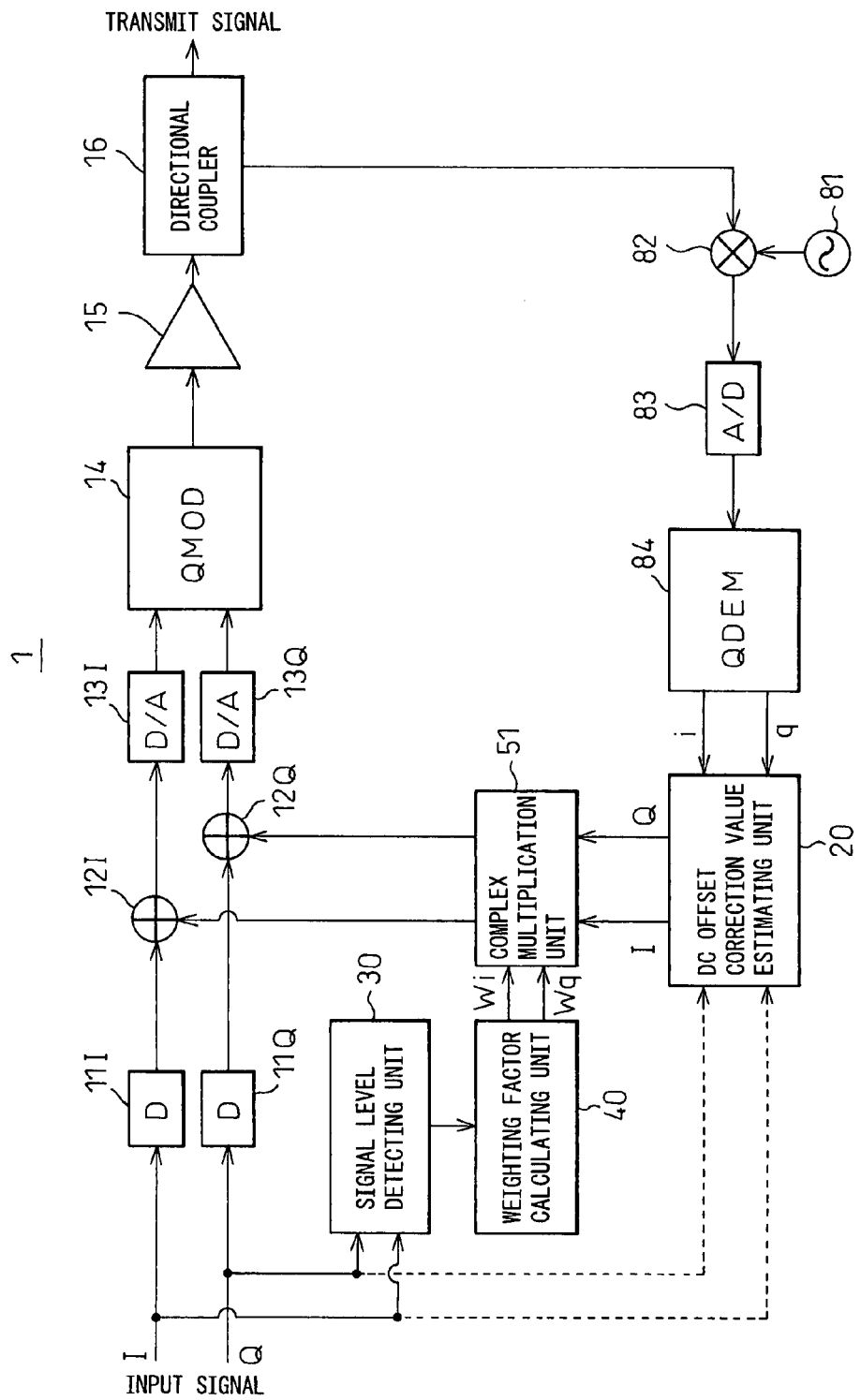
FIG. 12 is a diagram schematically showing the configuration of a quadrature modulation system according to a fourth embodiment of the present invention.

FIG. 12 is a diagram schematically showing the configuration of a quadrature modulation system according to a fourth embodiment of the present invention.

As can be seen from FIG. 2 previously shown, the variation of the DC offset caused by the variation in the signal level of the input signal occurs in both the amplitude and phase of the DC offset.

In the embodiments of the invention described herein, the weighting of the DC offset correction value may be performed with respect to either the amplitude or the phase of the DC offset or to both.

Here, when performing the weighting of the DC offset correction value with respect to the phase and thus involving the rotation of the phase, the weighting factor calculating unit 40 may calculate complex weighting factors Wi and Wq having in-phase and quadrature components I and Q, respectively, and a complex multiplication unit 51 as the weighting unit may perform complex multiplications by multiplying the DC offset correction value with the respective complex weighting factors, as shown in FIG. 12. The complex weighting factors Wi and Wq here may be given by equations (3) and (4) below.

$$Wi = r \times \cos \phi \quad (3)$$

$$Wq = r \times \sin \phi \quad (4)$$

Here, r is the weighting factor for the amplitude of the DC offset, and $\phi$ is the weighting factor for the phase.

Figure 13:
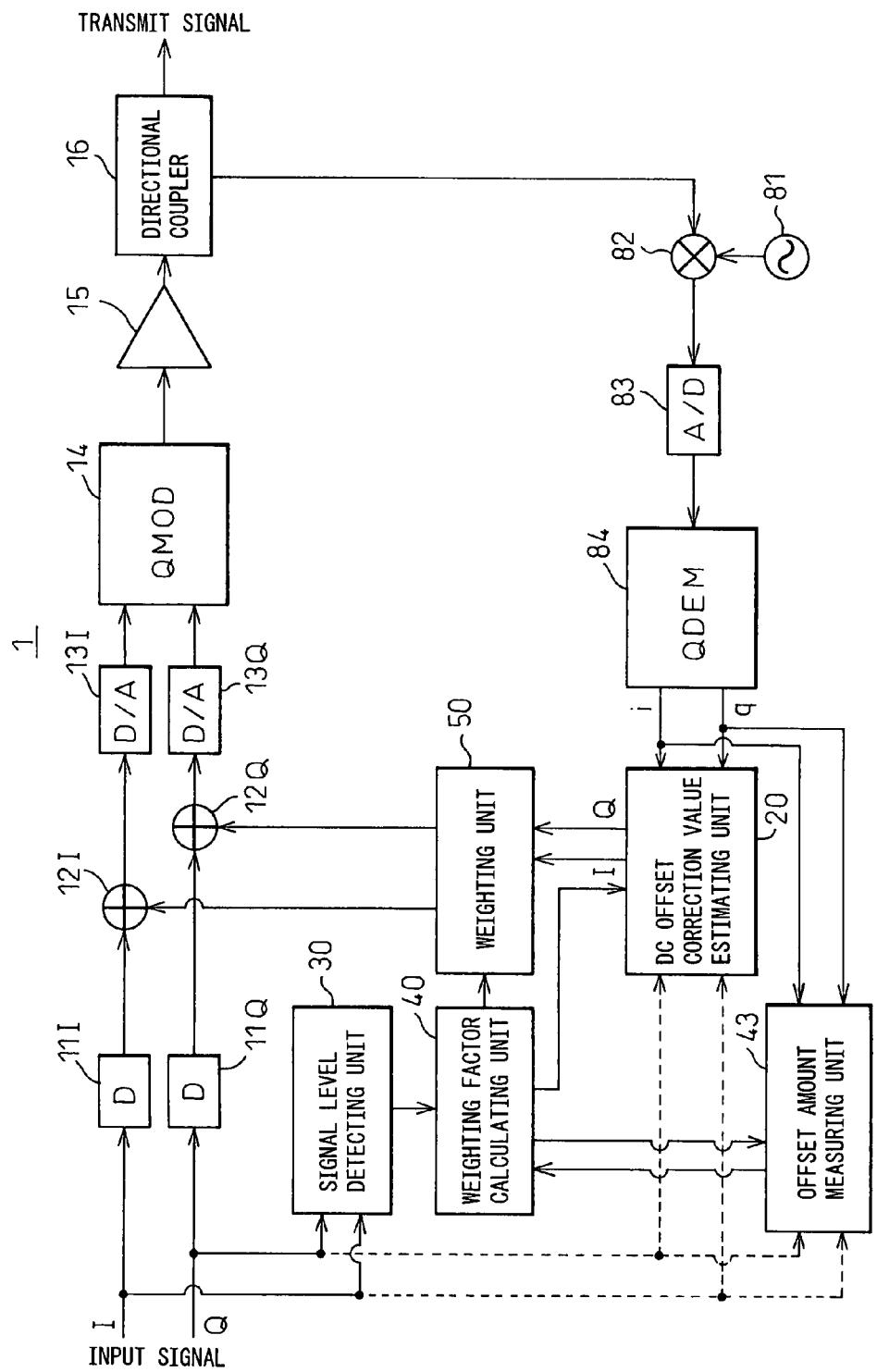
FIG. 13 is a diagram schematically showing the configuration of a quadrature modulation system according to a fifth embodiment of the present invention.
Figure 14:
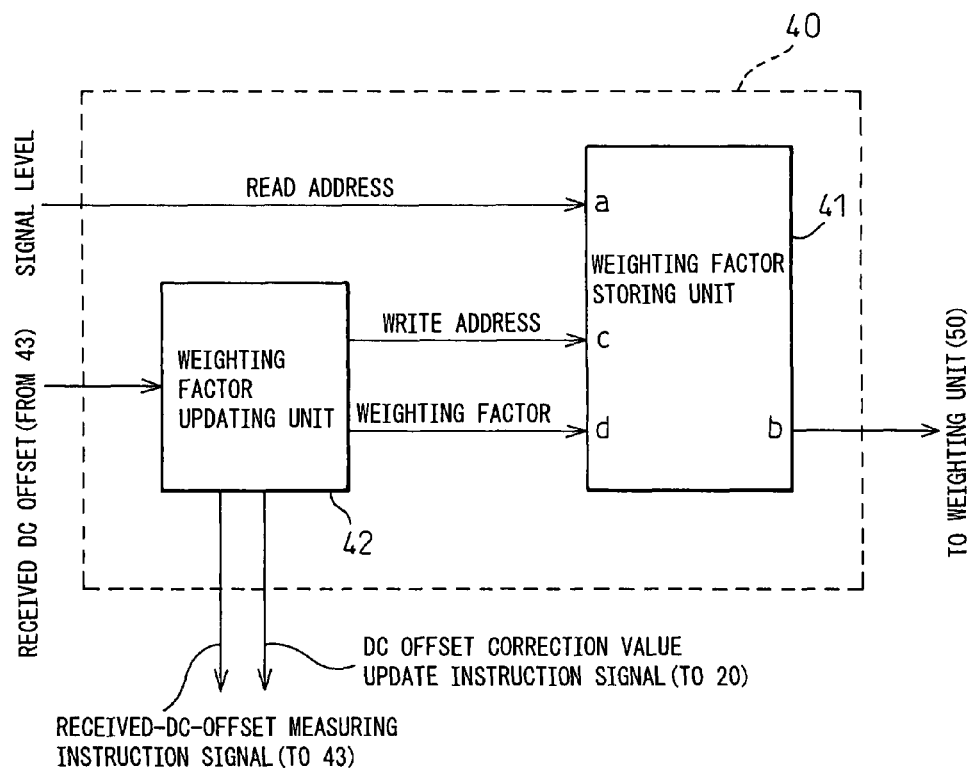
FIG. 14 is a diagram showing the configuration of a weighting factor calculating unit shown in FIG. 13.

FIG. 13 is a diagram schematically showing the configuration of a quadrature modulation system according to a fifth embodiment of the present invention, and FIG. 14 is a diagram showing the configuration of the weighting factor calculating unit 40 shown in FIG. 13. In this embodiment, the weighting factor calculating unit 40 stores weighting factor data for various input signal levels, and outputs from among the stored weighting factor data the weighting factor data that matches the signal level output from the signal level detecting unit 30.

Further, in the present embodiment, the offset amount of the DC offset contained in the transmit signal is measured during the transmission of the signal, and the weighting factor stored in the weighting factor calculating unit 40 is updated so as to minimize the offset amount.

For this purpose, the weighting factor calculating unit 40 comprises a weighting factor storing unit 41 for storing the weighting factor data for various input signal levels, a weighting factor updating unit 42 for updating the weighting factor data stored in the weighting factor storing unit 41, and an offset amount measuring unit 43 for measuring the offset amount of the DC offset contained in the transmit signal.

The weighting factor storing unit 41 is a dual port memory or a multi-port memory having at least a first address input (a) for receiving as an input a read address associated with the signal level of the input signal, a first data port (b) for reading out the weighting factor stored at the address received via the first address input and for outputting the weighting factor to the weighting unit 50, a second address input (c) for receiving as an input a write address specified by the weighting factor updating unit 42, and a second data port (d) for receiving as an input the weighting factor output from the weighting factor updating unit 42 and for storing it at the address received via the second address input.

The weighting factor updating unit 42 outputs a received-DC-offset measuring instruction signal for instructing the offset amount measuring unit 43 to measure the amount of the DC offset contained in the quadrature monitored signals i and q received from the quadrature demodulator 84, and receives the DC offset amount measured by the offset amount measuring unit 43.

Further, the weighting factor updating unit 42 outputs to the DC offset correction value estimating unit 20 a DC offset correction value update instruction signal for instructing the DC offset correction value estimating unit 20 to estimate the DC offset correction value.

When the received-DC-offset measuring instruction signal is received, the offset amount measuring unit 43 measures the DC offset contained in the quadrature monitored signals i and q received from the quadrature demodulator 84, and returns the result to the weighting factor updating unit 42.

The offset amount measuring unit 43 measures the integrated values of the quadrature monitored signals i and q, or the differences between these integrated values and the integrated values of the input signals I and Q, as the DC offset contained in the quadrature monitored signals i and q.

When the DC offset correction value update instruction signal is received, the DC offset correction value estimating unit 20 estimates the DC offset correction value, and outputs the newly updated DC offset correction value to the weighting unit 50.

Figure 15:
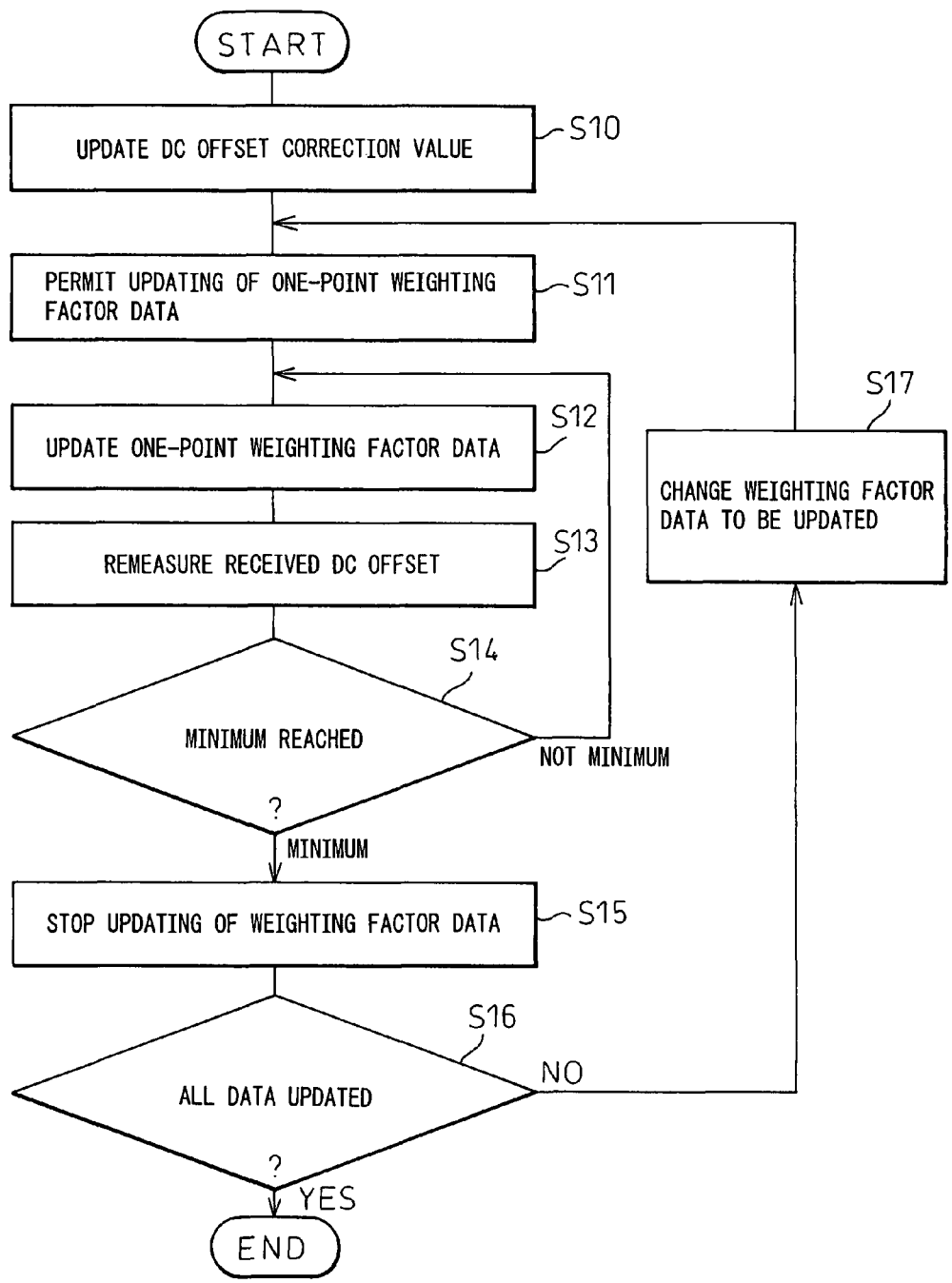
FIG. 15 is a flowchart illustrating the operation for updating weighting factor data stored in a weighting factor storing unit shown in FIG. 14.

FIG. 15 is a flowchart illustrating the operation for updating the weighting factor data stored in the weighting factor storing unit 41 shown in FIG. 14.

In step S10, the weighting factor updating unit 42 outputs the DC offset correction value update instruction signal to the DC offset correction value estimating unit 20. The DC offset correction value estimating unit 20 that received this signal updates the DC offset correction value to the latest value which is output.

In step S11, the weighting factor updating unit 42 gives permission to update the weighting factor data stored at a designated one of the addresses in the weighting factor storing unit 41, i.e., the weighting factor data for a designated one of the input signal levels (hereinafter called the "one-point weighting factor data").

In step S12, the weighting factor updating unit 42 accesses the designated address, increments or decrements the one-point weighting factor data by a prescribed small step, and writes it back to the weighting factor storing unit 41 to update the data.

To determine the update direction (increment or decrement) of the weighting factor data to be updated by the weighting factor updating unit 42, the first update is done in either the incrementing or decrementing direction, whichever is appropriate; then, the DC offset amount measured in the next step is observed, and the update direction is automatically set to the direction that reduces the offset amount.

When an input signal having the corresponding signal level is applied, the updated one-point weighting factor data is read out from the read address associated with that signal level, and the data is used in the weighting unit 50 to weight the offset correction value. Here, updating the weighting factor data causes a variation in the DC offset contained in the transmit signal.

Therefore, in step S13, the weighting factor updating unit 42 outputs the received-DC-offset measuring instruction signal to the offset amount measuring unit 43, and acquires the latest DC offset amount from the offset amount measuring unit 43.

In step S14, it is determined whether the offset amount acquired in step S13 has reached a minimum as a result of the updating of the one-point weighting factor data. If the offset amount has reached a minimum, the updating of the one-point weighting factor data is stopped (step S15), but if it has not yet reached a minimum, the process returns to step S12 to update the one-point weighting factor data once again.

The determination as to whether the offset amount acquired in step S13 has reached a minimum or not may be made, for example, by comparing the offset amount measured in step S13 in the current loop with the offset amount measured in the previous loop and by checking if the offset amount that kept decreasing until the previous comparison has changed from decreasing to increasing, thus reaching a minimum.

Then, following steps S16 and S17, the process from steps S11 to S15 is repeated until all the weighting factor data stored in the weighting factor storing unit 41 are processed. In this way, the weighting factor data for every input signal level is updated.

Figure 16:
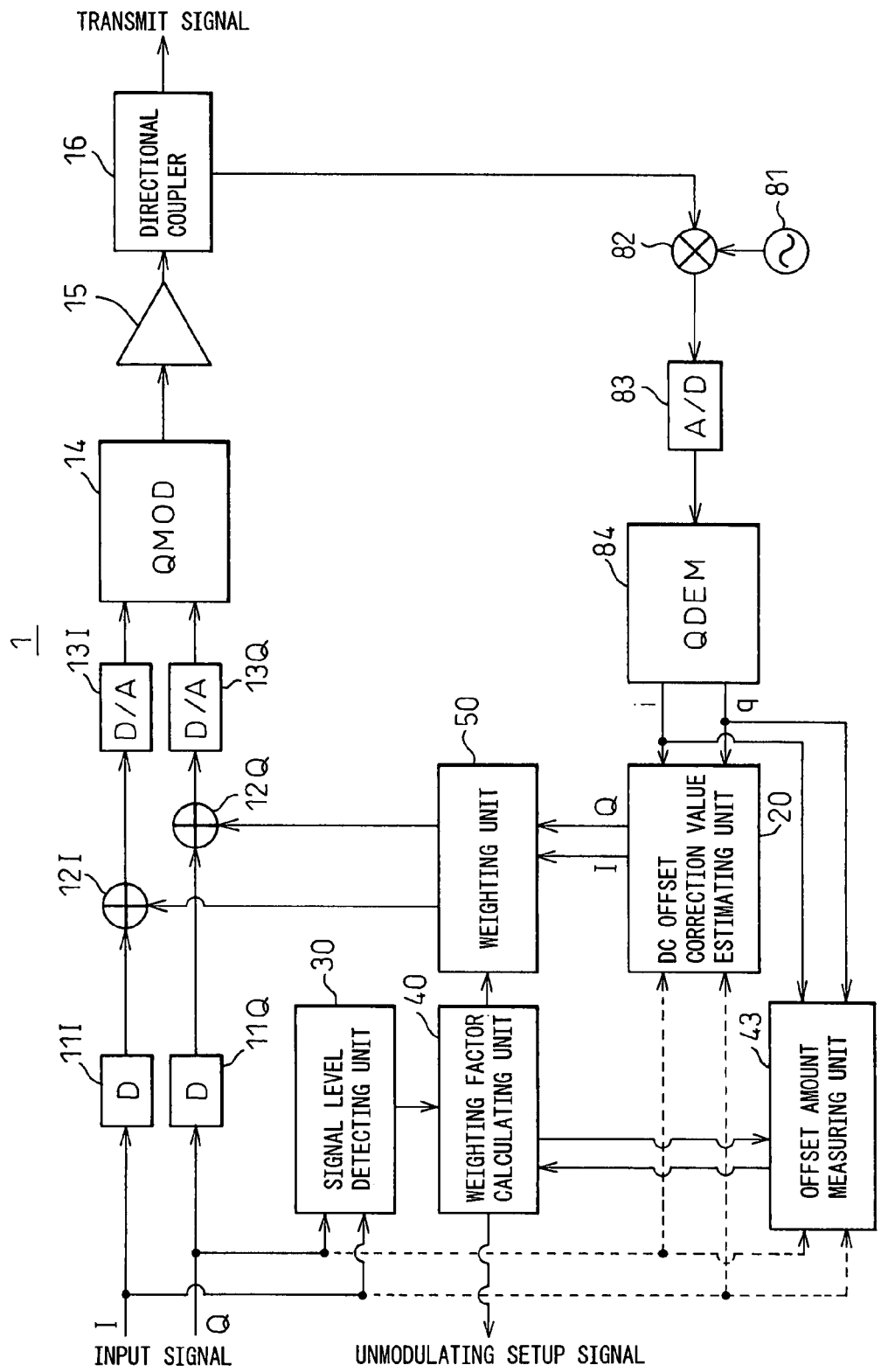
FIG. 16 is a diagram schematically showing the configuration of a quadrature modulation system according to a sixth embodiment of the present invention.
Figure 17:
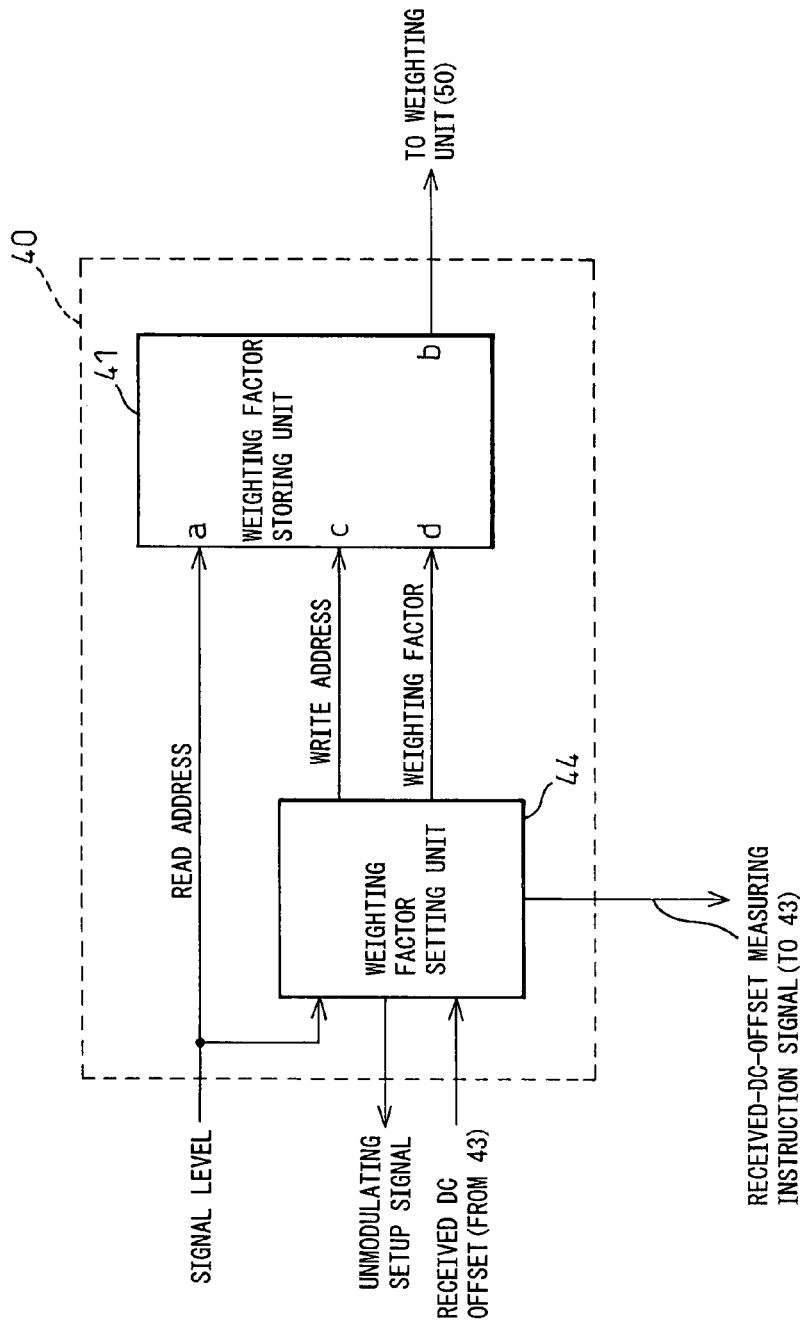
FIG. 17 is a diagram showing the configuration of a weighting factor setting unit shown in FIG. 16.

FIG. 16 is a diagram schematically showing the configuration of a quadrature modulation system according to a sixth embodiment of the present invention, and FIG. 17 is a diagram showing the configuration of the weighting factor calculating unit 40 shown in FIG. 16. This embodiment is the same as the foregoing fifth embodiment in that the weighting factor calculating unit 40 stores weighting factor data for various input signal levels and outputs from among the stored weighting factor data the weighting factor data that matches the signal level output from the signal level detecting unit 30, but differs in that the weighting factor data is set in advance by using a training signal before signal transmission of the quadrature modulation system 1.

For this purpose, the weighting factor calculating unit 40 comprises the previously described weighting factor storing unit 41, a weighting factor setting unit 44 for setting the weighting factor data to be stored in the weighting factor storing unit 41, and the previously described offset amount measuring unit 43.

The weighting factor setting unit 44 outputs a received-DC-offset measuring instruction signal for instructing the offset amount measuring unit 43 to measure the amount of the DC offset contained in the quadrature monitored signals i and q received from the quadrature demodulator 84, and receives the DC offset amount measured by the offset amount measuring unit 43.

Further, the weighting factor setting unit 44 supplies, to a transmitting device (not shown) transmitting an input signal (transmit data) to the quadrature modulation system 1, an unmodulating setup signal for causing the transmitting device to transmit a training signal which is an unmodulating signal with a constant signal level instead of the usual transmit data which is a modulating signal having a varying signal level.

Figure 18:
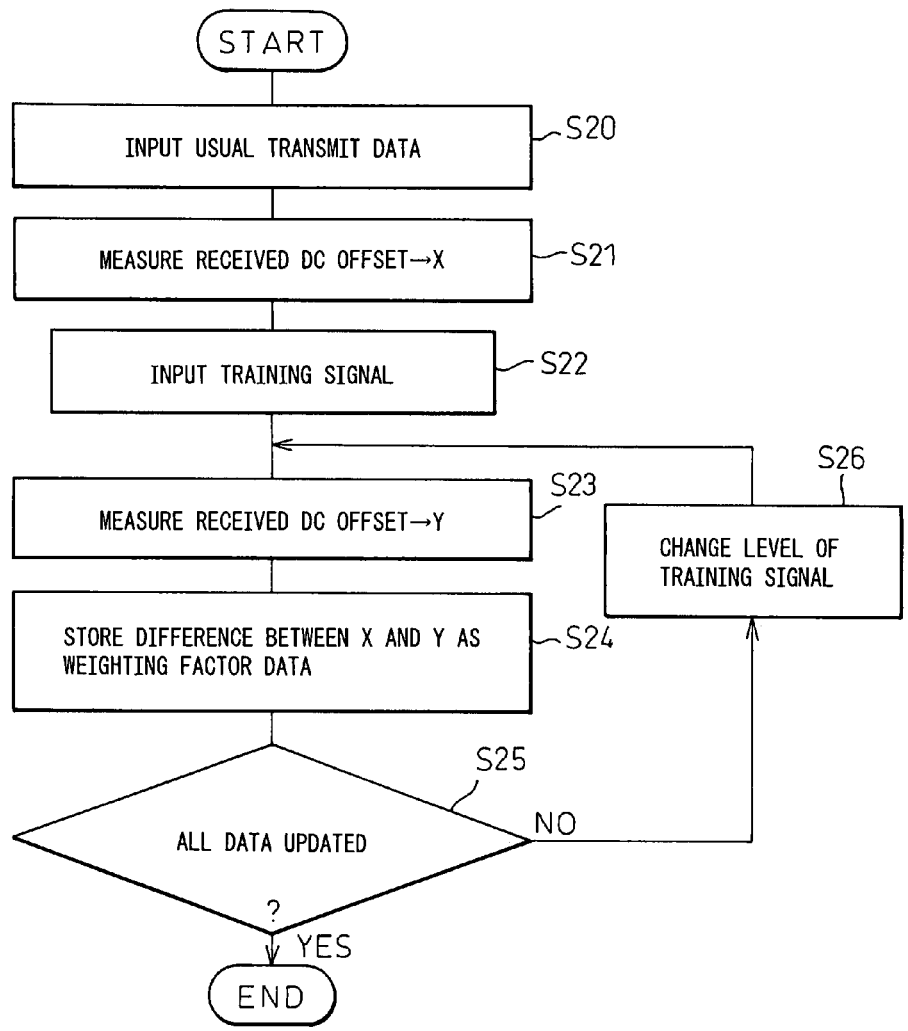
FIG. 18 is a flowchart illustrating the operation for updating the weighting factor data stored in the weighting factor storing unit shown in FIG. 17.

FIG. 18 is a flowchart illustrating the operation for updating the weighting factor data stored in the weighting factor storing unit 41 shown in FIG. 17.

In step S20, the quadrature modulation system 1 receives as an input the usual transmit data generated by the transmitting device (not shown).

Then, in step S21, the weighting factor setting unit 44 outputs the received-DC-offset measuring instruction signal to the offset amount measuring unit 43, and acquires the amount X of the DC offset contained in the modulating signal.

Next, in step S22, the weighting factor setting unit 44 sends the unmodulating setup signal to the transmitting device (not shown). In response, the transmitting device (not shown) transmits to the quadrature modulation system 1 the training signal which is a constant-level unmodulating signal instead of the usual transmit data which is a modulating signal.

In step S23, the weighting factor setting unit 44 outputs the received-DC-offset measuring instruction signal to the offset amount measuring unit 43, and acquires the DC offset amount Y when the training signal is input.

In step S24, the weighting factor setting unit 44 calculates the difference between the DC offset amount Y measured in step S23 and the DC offset amount X measured in step S21, and stores the difference as the weighting factor data corresponding to the signal level of the training signal in the weighting factor storing unit 41.

Then, following steps S25 and S26, the process from steps S23 to S24 is repeated for each signal level while varying the signal level of the training signal, and the weighting factor data for each signal level is stored in the weighting factor storing unit 41.

Figure 19:
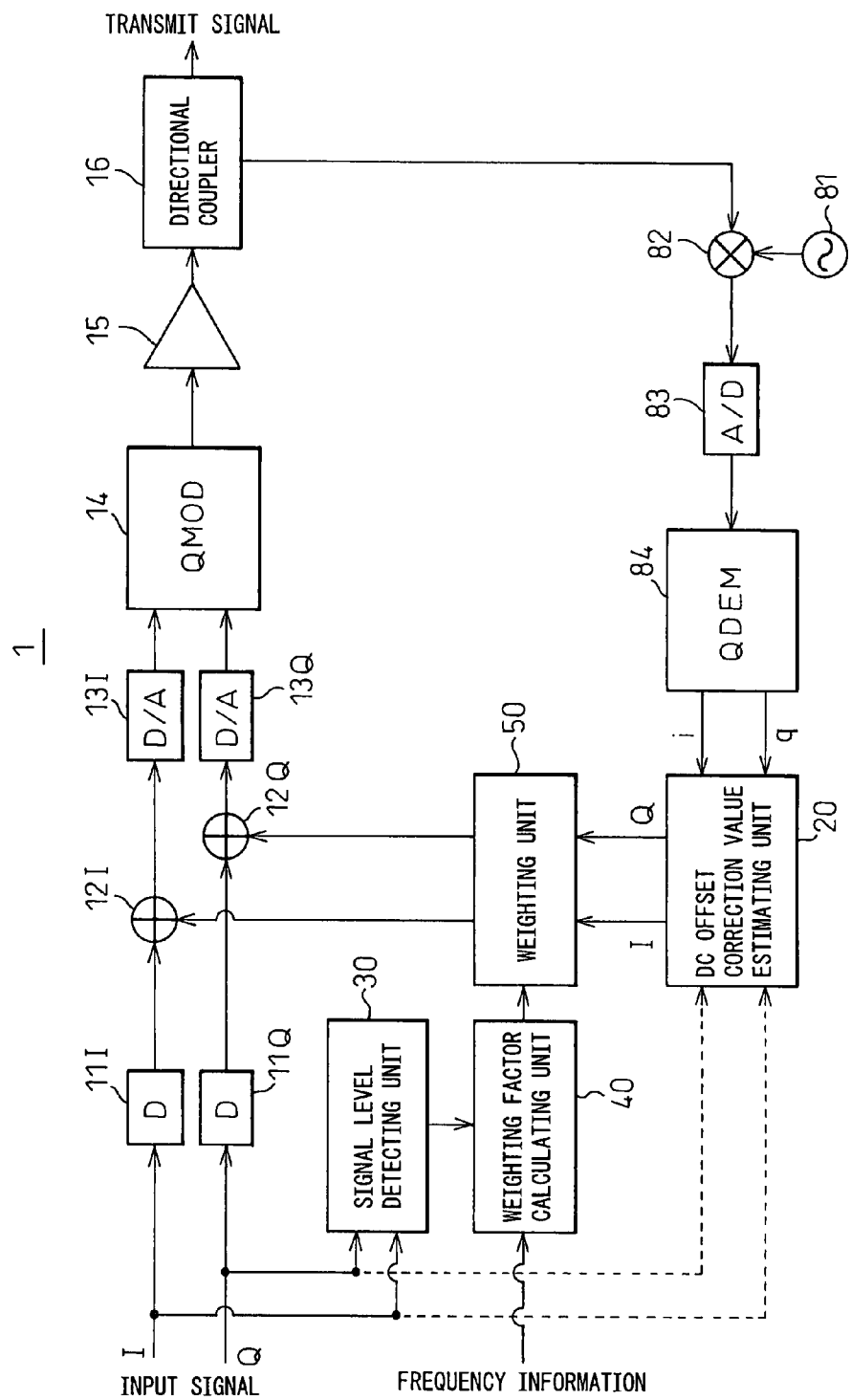
FIG. 19 is a diagram schematically showing the configuration of a quadrature modulation system according to a seventh embodiment of the present invention.
Figure 20:
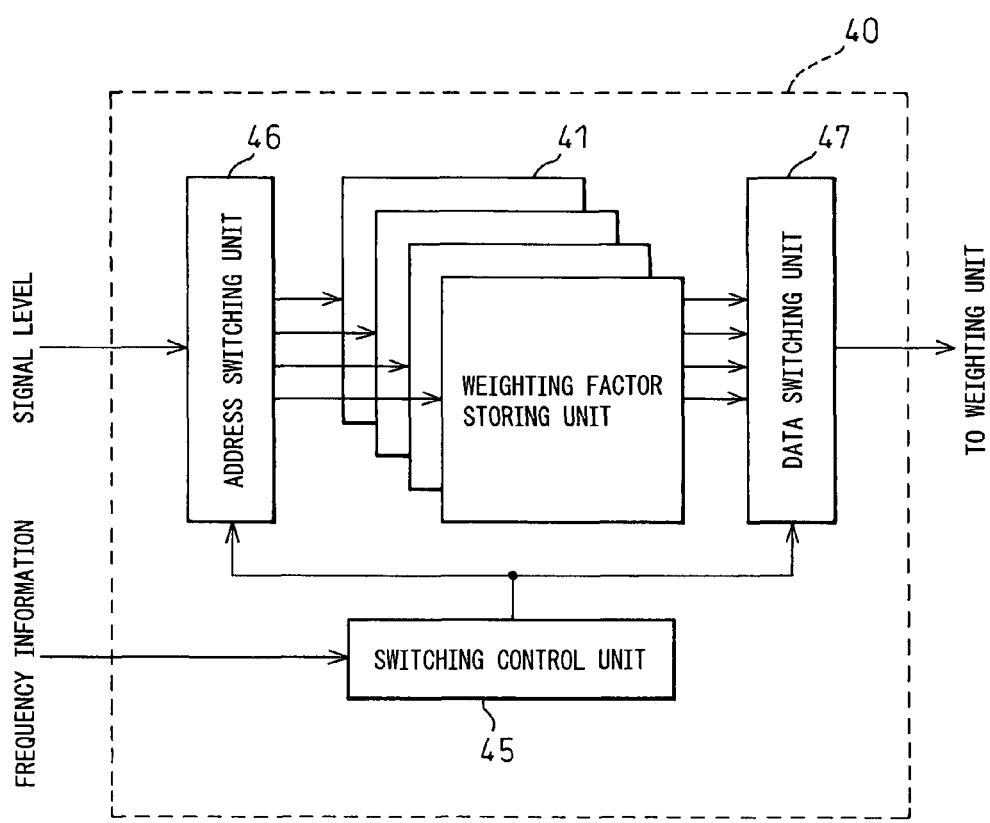
FIG. 20 is a diagram showing the configuration of the weighting factor setting unit shown in FIG. 19.

FIG. 19 is a diagram schematically showing the configuration of a quadrature modulation system according to a seventh embodiment of the present invention, and FIG. 20 is a diagram showing the configuration of the weighting factor calculating unit 40 shown in FIG. 19. In this embodiment, the weighting factor calculating unit 40 adjusts the weighting factor for the DC offset correction value in accordance with the frequency of the input signal.

For this purpose, the weighting factor calculating unit 40 comprises, as shown in FIG. 20, a plurality of weighting factor storing units 41 each for storing the weighting factor data associated with each signal level of the input signal for a plurality of frequencies of the input signal. Each weighting factor storing unit 41 is constructed from a plurality of storing means such as memories for storing the weighting factor data for the respective frequencies of the input signal.

The weighting factor calculating unit 40 further comprises: a switching control unit 45 for receiving frequency information indicating the frequency of the input signal from the transmitting device (not shown) transmitting the transmit data to the quadrature modulation system 1, and for performing switching so as to select the memory that forms the weighting factor storing unit 41 associated with the frequency information; an address switching unit 46 for performing switching to connect the level signal of the signal level detecting unit 30 as the read address to the address input of the memory of the weighting factor storing unit 41 selected by the switching control unit 45; and a data switching unit 47 for performing switching to connect the data output of the selected memory to the weighting unit 50.

Figure 21:
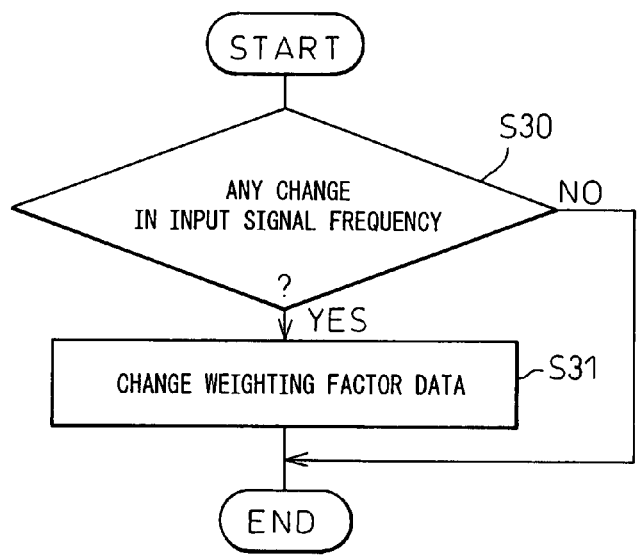
FIG. 21 is a flowchart illustrating the operation for adjusting the weighting factor in accordance with the frequency of the input signal.

FIG. 21 is a flowchart illustrating the operation for adjusting the weighting factor in accordance with the frequency of the input signal.

In step S30, the switching control unit 45 in the weighting factor calculating unit 40 of FIG. 20 receives frequency information indicating the frequency of the input signal from the transmitting device (not shown). If there is a change in frequency, in step S31 the switching control unit 45 in FIG. 20 selects the memory that forms the weighting factor storing unit 41 associated with the received frequency information, and connects the selected memory to the level signal output of the signal level detecting unit 30 and an input of the weighting unit 50 in FIG. 19 via the address switching unit 46 and the data switching unit 47, respectively.

Figure 22:
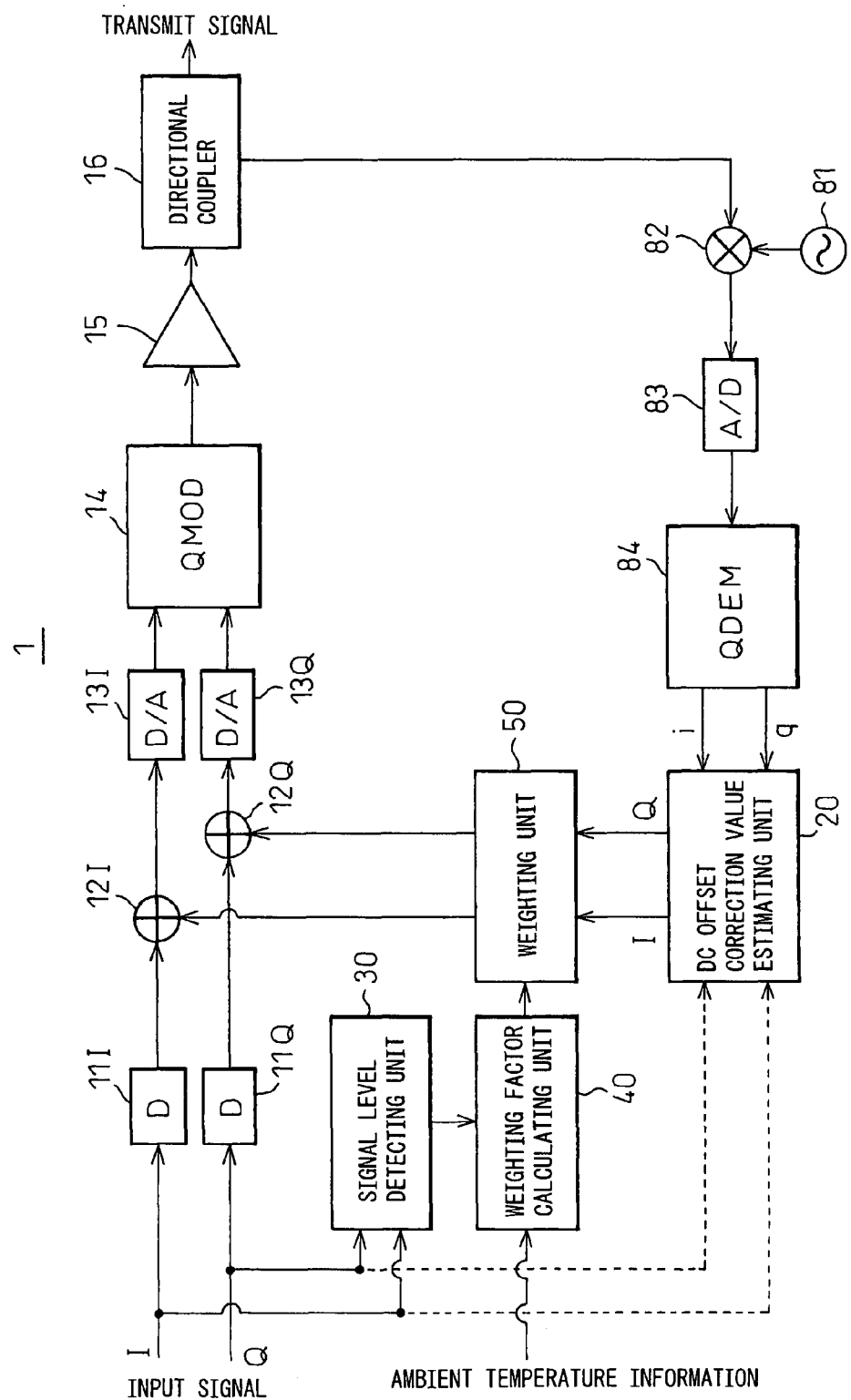
FIG. 22 is a diagram schematically showing the configuration of a quadrature modulation system according to an eighth embodiment of the present invention.
Figure 23:
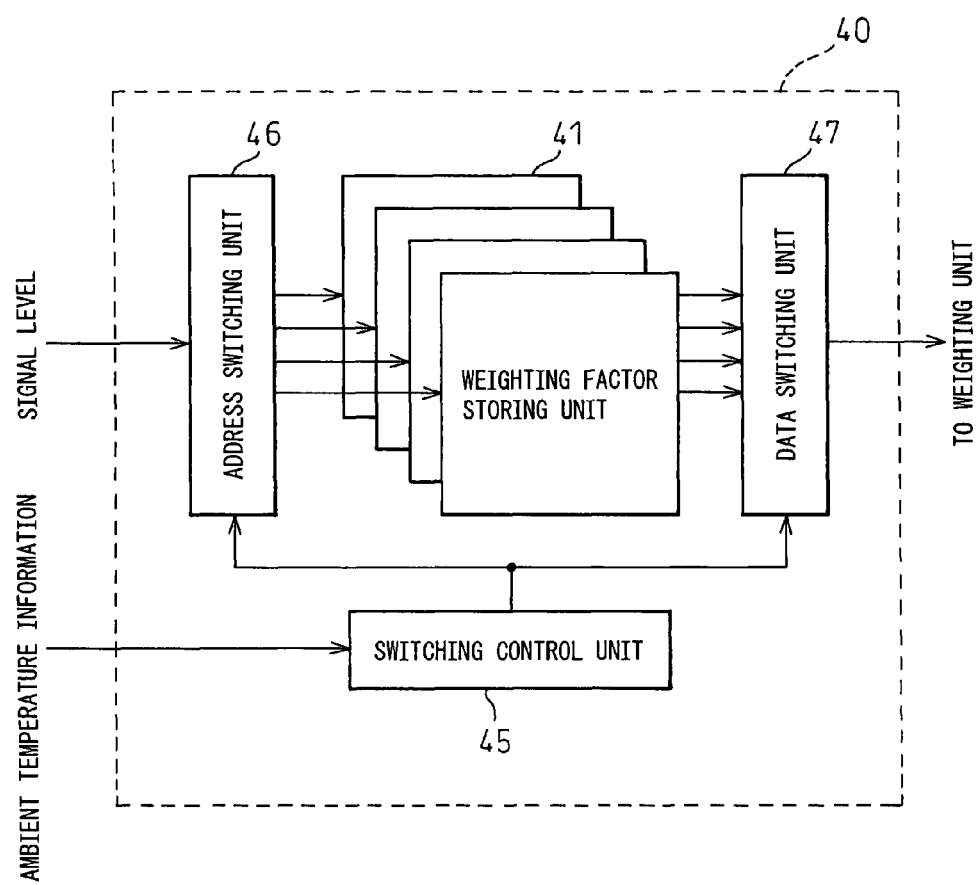
FIG. 23 is a diagram showing the configuration of the weighting factor setting unit shown in FIG. 22.

FIG. 22 is a diagram schematically showing the configuration of a quadrature modulation system according to an eighth embodiment of the present invention, and FIG. 23 is a diagram showing the configuration of the weighting factor calculating unit 40 shown in FIG. 22. In this embodiment, the weighting factor calculating unit 40 adjusts the weighting factor for the DC offset correction value in accordance with the ambient temperature at which quadrature modulation is performed by the quadrature modulation system 1.

For this purpose, the weighting factor calculating unit 40 comprises, as shown in FIG. 23, a plurality of weighting factor storing units 41 each for storing the weighting factor data associated with each signal level of the input signal for a plurality of ambient temperatures at which the quadrature modulation is performed. Each weighting factor storing unit 41 is constructed from a plurality of storing means such as memories for storing the weighting factor data for the respective ambient temperatures.

The weighting factor calculating unit 40 further comprises: a switching control unit 45 for receiving ambient temperature information of the quadrature modulation system 1 from an external temperature sensor (not shown), and for performing switching so as to select the memory that forms the weighting factor storing unit 41 associated with the ambient temperature; an address switching unit 46 for performing switching to connect the level signal of the signal level detecting unit 30 as the read address to the address input of the memory of the weighting factor storing unit 41 selected by the switching control unit 45; and a data switching unit 47 for performing switching to connect the data output of the selected memory to the weighting unit 50.

Figure 24:
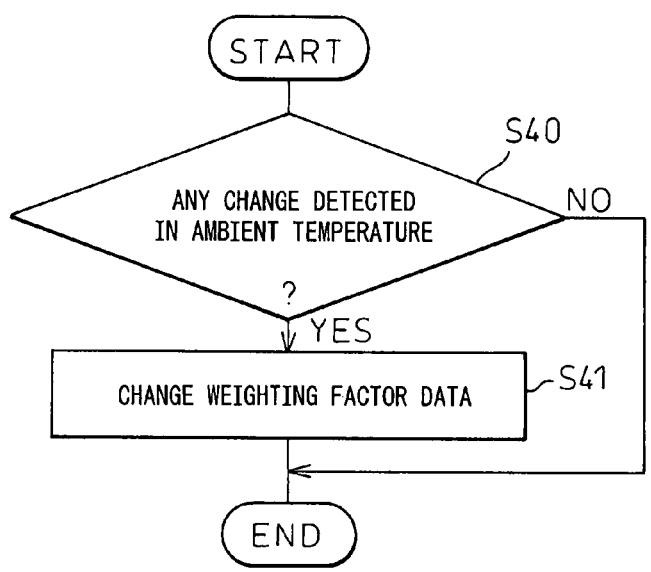
FIG. 24 is a flowchart illustrating the operation for adjusting the weighting factor in accordance with ambient temperature.

FIG. 24 is a flowchart illustrating the operation for adjusting the weighting factor in accordance with the ambient temperature.

In step S40, the switching control unit 45 in the weighting factor calculating unit 40 of FIG. 23 receives ambient temperature information indicating the ambient temperature from the temperature sensor (not shown). If there is a change in ambient temperature, in step S41 the switching control unit 45 in FIG. 23 selects the memory that forms the weighting factor storing unit 41 associated with the received ambient temperature information, and connects the selected memory to the level signal output of the signal level detecting unit 30 and an input of the weighting unit 50 in FIG. 22 via the address switching unit 46 and the data switching unit 47, respectively.

Figure 25:
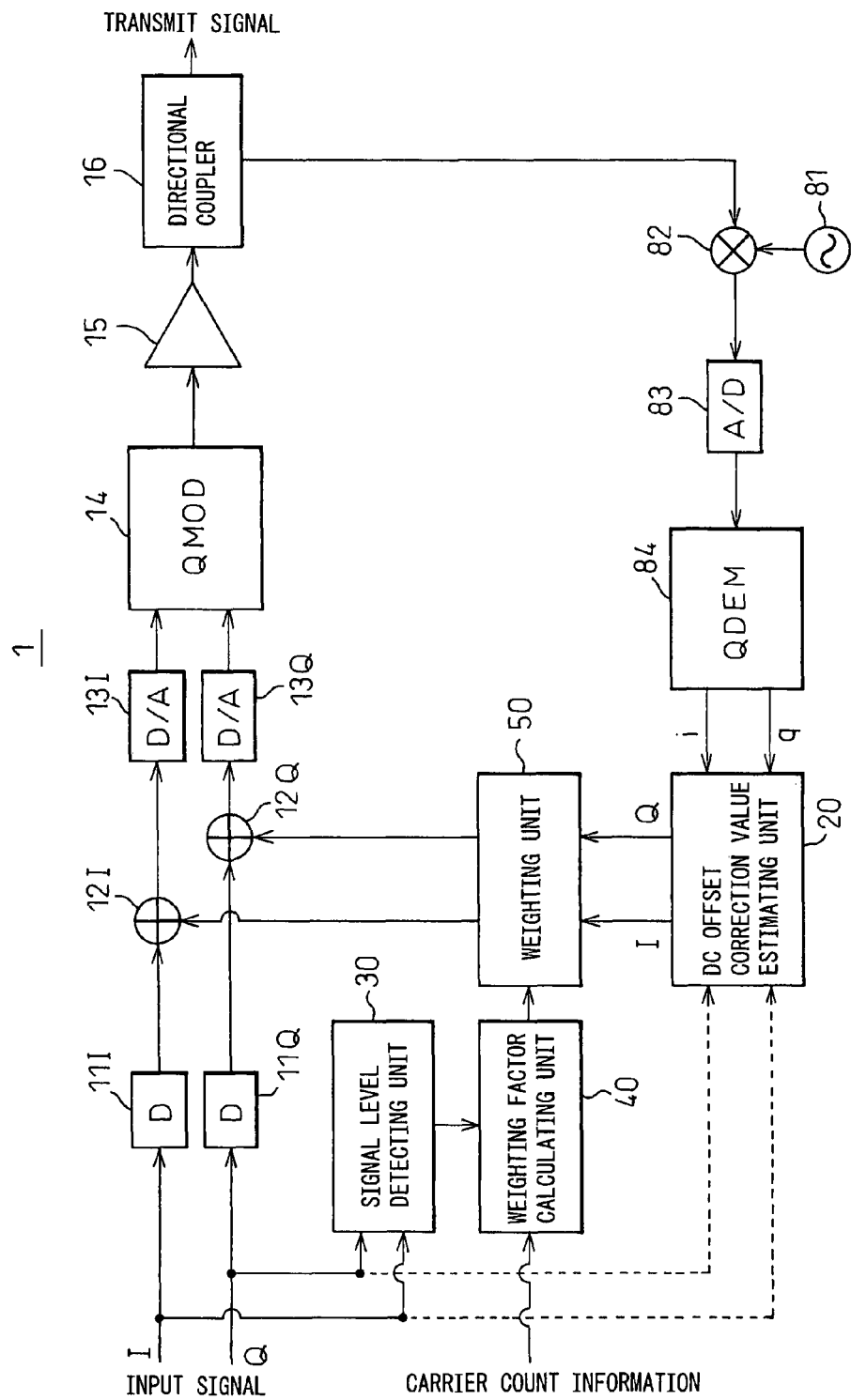
FIG. 25 is a diagram schematically showing the configuration of a quadrature modulation system according to a ninth embodiment of the present invention.
Figure 26:
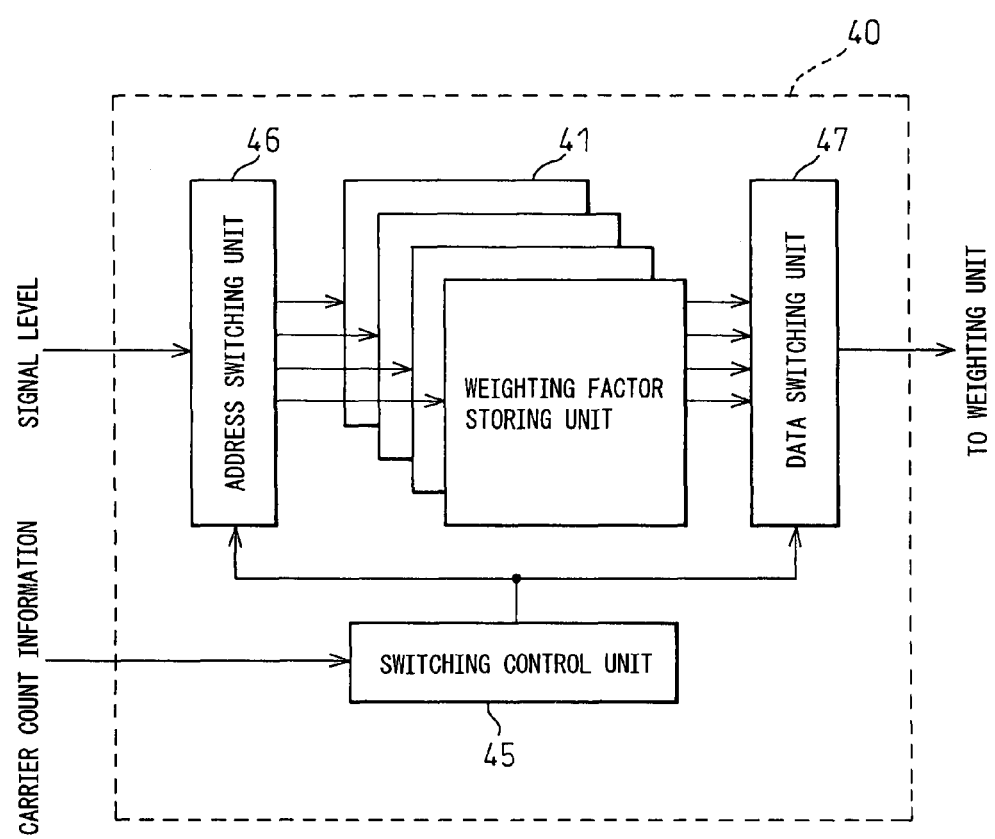
FIG. 26 is a diagram showing the configuration of the weighting factor setting unit shown in FIG. 25.

FIG. 25 is a diagram schematically showing the configuration of a quadrature modulation system according to a ninth embodiment of the present invention, and FIG. 26 is a diagram showing the configuration of the weighting factor calculating unit 40 shown in FIG. 25. In this embodiment, the weighting factor calculating unit 40 adjusts the weighting factor for the DC offset correction value in accordance with the number of carriers forming the input signal.

For this purpose, the weighting factor calculating unit 40 comprises, as shown in FIG. 26, a plurality of weighting factor storing units 41 each for storing the weighting factor data associated with each signal level of the input signal for different numbers of carriers forming the input signal. Each weighting factor storing unit 41 stores the weighting factor data for the different numbers of carriers forming the input signal.

The weighting factor calculating unit 40 further comprises: a switching control unit 45 for receiving carrier count information indicating the number of carriers forming the input signal from the transmitting device (not shown) transmitting the transmit data to the quadrature modulation system 1, and for performing switching so as to select the memory that forms the weighting factor storing unit 41 associated with the carrier count information; an address switching unit 46 for performing switching to connect the level signal of the signal level detecting unit 30 as the read address to the address input of the memory that forms the weighting factor storing unit 41 selected by the switching control unit 45; and a data switching unit 47 for performing switching to connect the data output of the selected memory to the weighting unit 50.

Figure 27:
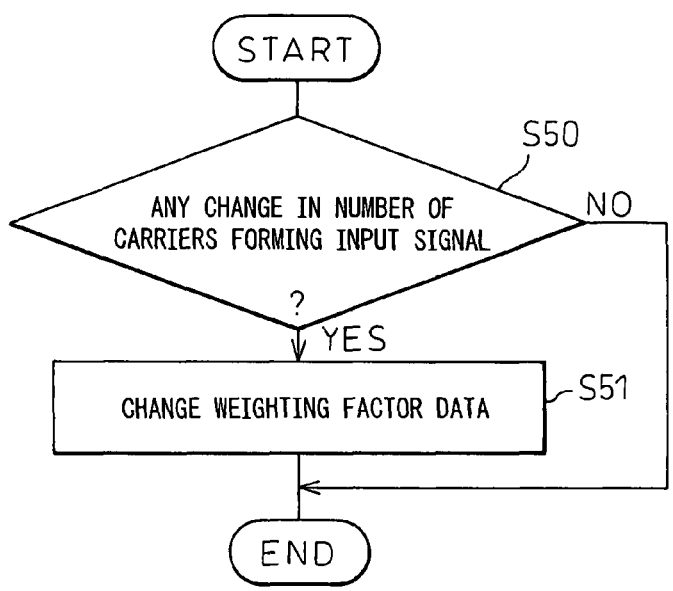
FIG. 27 is a flowchart illustrating the operation for adjusting the weighting factor in accordance with the number of carriers.

FIG. 27 is a flowchart illustrating the operation for adjusting the weighting factor in accordance with the number of carriers forming the input signal.

In step S50, the switching control unit 45 in the weighting factor calculating unit 40 of FIG. 26 receives carrier count information indicating the number of carriers forming the input signal from the transmitting device (not shown). If there is a change in the number of carriers, in step S51 the switching control unit 45 selects the weighting factor storing unit 41 associated with the received carrier count information, and connects the selected unit to the level signal of the signal level detecting unit 30 and an input of the weighting unit 50 via the address switching unit 46 and the data switching unit 47, respectively.

Figure 28:
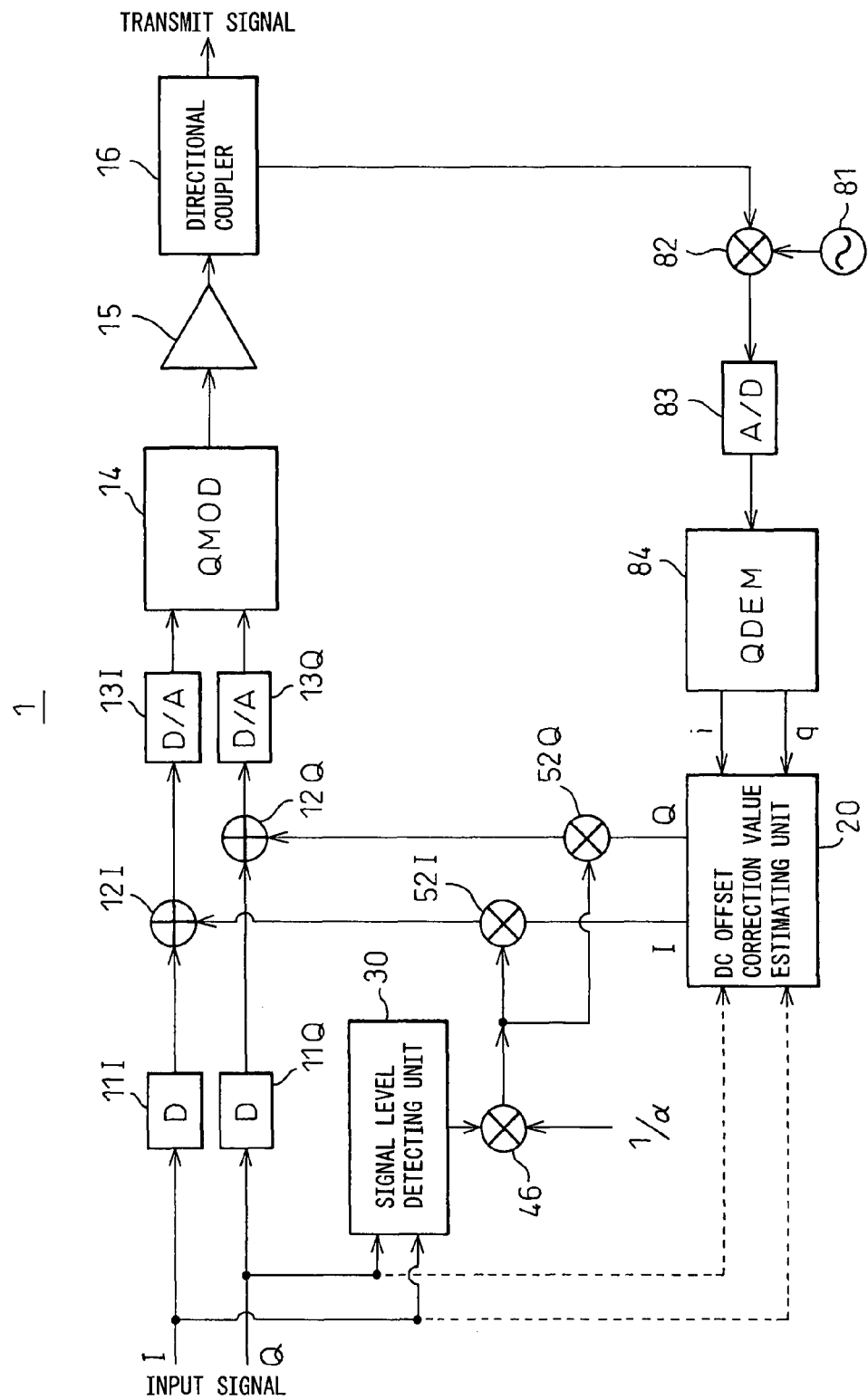
FIG. 28 is a diagram schematically showing the configuration of a quadrature modulation system according to a 10th embodiment of the present invention.

FIG. 28 is a diagram schematically showing the configuration of a quadrature modulation system according to a 10th embodiment of the present invention. According to this embodiment, the DC offset amount can be compensated for by using a simple configuration in the case of the quadrature modulation system in which the DC offset amount is substantially proportional to the signal level of the input signal.

For this purpose, the quadrature modulation system 1 includes: a multiplier 46 as a weighting factor calculating unit for multiplying the signal level detected by the signal level detecting unit 30 by a constant 1/α and thereby calculating the weighting factor proportional to the signal level; and multipliers 52I and 52Q for multiplying the DC offset correction value output from the DC offset correction value estimating unit 20 by the thus calculated weighting factor.

Figure 29:
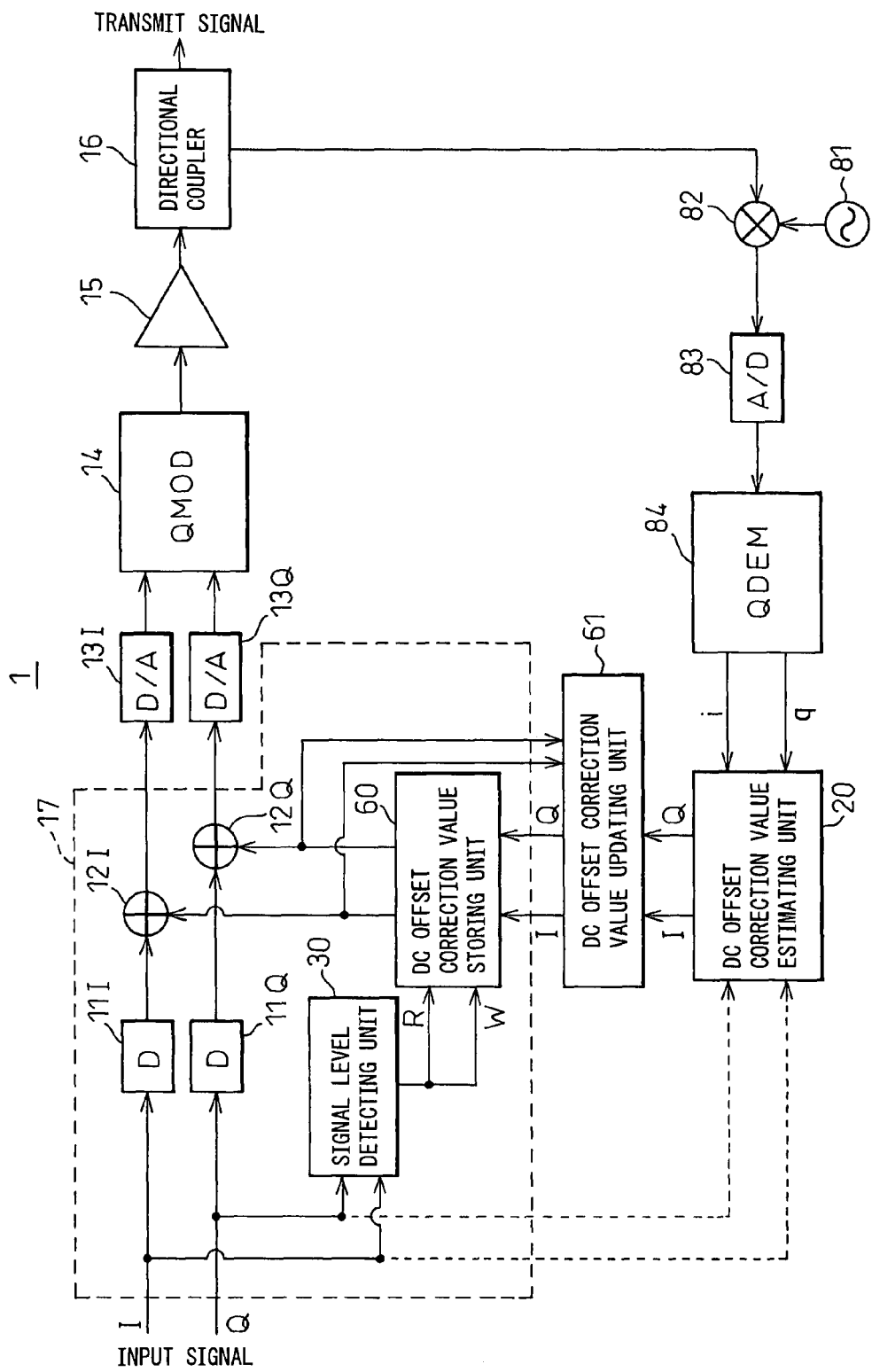
FIG. 29 is a diagram schematically showing the configuration of a quadrature modulation system according to an 11th embodiment of the present invention.

FIG. 29 is a diagram schematically showing the configuration of a quadrature modulation system according to an 11th embodiment of the present invention. In this embodiment, DC offset correction values are stored, one for each different signal level of the input signal. Then, a corresponding one of the stored DC offset correction values is retrieved based on the signal level of the input signal, and the DC offset is compensated for by using the thus retrieved DC offset correction value.

For this purpose, the quadrature modulation system 1 includes a DC offset correction value storing unit 60 for storing the DC offset correction values for various signal levels of the input signal. The DC offset correction value storing unit 60 may be constructed from a lookup table (LUT) or the like. The DC offset correction value corresponding to the input signal level detected by the signal level detecting unit 30 is retrieved from the DC offset correction value storing unit 60 by using the signal level as the read address, and the DC offset correction value thus retrieved is supplied to the adders 12I and 12Q.

The DC offset correction value that the DC offset correction value estimating unit 20 estimates from the transmit signal may be stored directly as the DC offset correction value in the DC offset correction value storing unit 60.

If there is a variation in the DC offset contained in the transmit signal generated from the input signal of the same signal level, the DC offset correction value stored in the DC offset correction value storing unit 60 may be updated in such a manner that the stored DC offset correction value is incrementally brought closer to the DC offset correction value output from the DC offset correction value estimating unit 20, rather than updating the stored DC offset correction value to the output value itself each time the DC offset correction value is output from the DC offset correction value estimating unit 20.

For this purpose, the quadrature modulation system 1 includes, as shown in FIG. 29, a DC offset correction value updating unit 61 for updating the DC offset correction value stored in the DC offset correction value storing unit 60 in such a manner that the stored DC offset correction value incrementally approaches the current DC offset correction value estimated by the DC offset correction value estimating unit 20.

Then, based on the currently stored DC offset correction value $Txm_{[n+]}$ and the DC offset correction value $Tx_{offset[n]}$ output from the DC offset correction value estimating unit 20, the DC offset correction value updating unit 61 calculates the updated DC offset correction value $Txm_{[n+1]}$ to be stored in the DC offset correction value storing unit 60, for example, in accordance with the following equation (5).

$$Txm_{[n+1]} = Txm_{[n]} + \mu 2 \times Tx_{offset[n]} \quad (5)$$

In this way, the DC offset correction value may be stored in the DC offset correction value storing unit 60 while incrementally updating the value. Here, μ2 is a constant that defines the size of the incremental step.

Figure 30A:
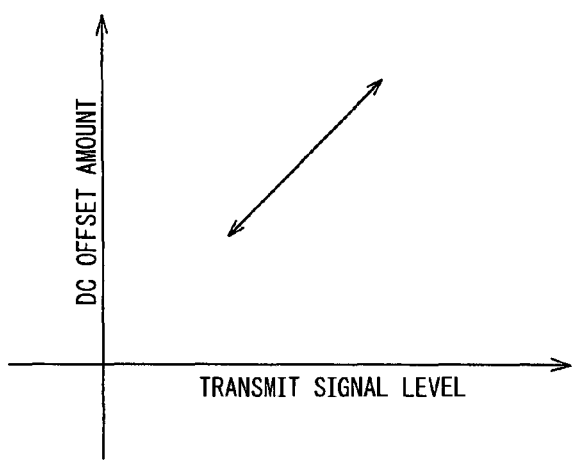
FIG. 30A is a graph showing the relationship between DC offset amount and transmit signal level when there is no hysteresis.
Figure 30B:
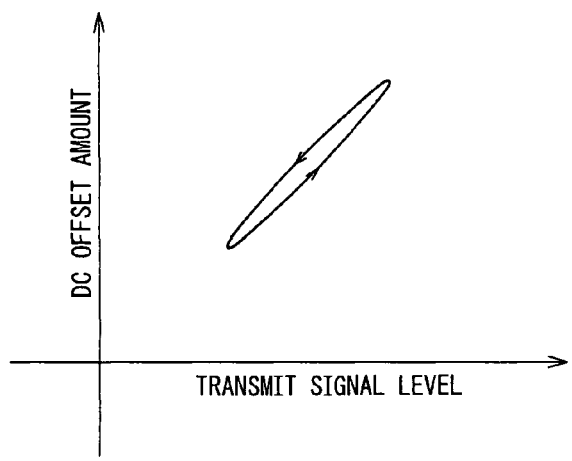
FIG. 30B is a graph showing the relationship between DC offset amount and transmit signal level when there is a hysteresis.

Now consider the case where there is a hysteresis in the DC offset contained in the transmit signal, as will be described with reference to FIGS. 30A and 30B. FIG. 30A is a graph showing the relationship between the DC offset amount and the transmit signal level when there is no hysteresis, and FIG. 30B is a graph showing the relationship between the DC offset amount and the transmit signal level when there is a hysteresis. When there is such a hysteresis, the offset amount of the DC offset contained in the transmit signal does not show the same value for the same transmit signal level when the signal level increases as when it decreases.

Accordingly, to compensate for such an offset amount, the DC offset correction value storing unit 60 shown in FIG. 29 must be made multidimensional so that a plurality of offset correction values can be stored for the same input signal in accordance with the amount by which the input signal level changes with time.

FIG. 31 is a diagram showing a configuration example of the input signal receiving stage 17 of FIG. 29 when the DC offset correction value storing unit 60 of the quadrature modulation system shown in FIG. 29 is made multidimensional in order to compensate for the DC offset amount having a hysteresis characteristic.

This configuration includes a signal level change calculating unit 67 which comprises a delay element 62 for delaying the output of the signal level detecting unit 30 and a subtractor 63 one input of which is connected to the output of the delay element 62 and the other input of which is directly connected to the output of the signal level detecting unit 30. The signal level change calculating unit 67 calculates the amount of change of the input signal level with time by calculating the difference between the current input signal level and the preceding input signal level.

Here, the memory space of the DC offset correction value storing unit 60 is, for example, made two-dimensional. Further, the DC offset correction value storing unit 60 is constructed as a two-dimensional lookup table with the output of the signal level detecting unit 30 as the first dimension read address and the output of the subtractor 63 as the second dimension read address. By employing such a configuration, when there is a hysteresis in the DC offset amount, the DC offset correction value storing unit 60 can store DC offset correction values that not only differ in accordance with the signal level of the input signal, but also differ in accordance with the amount of change of the input signal level with time. As a result, data that not only matches the signal level of the input signal but also matches the amount of change calculated by the signal level change calculating unit can be retrieved from among the stored DC offset correction values.

Further, in the above configuration, when writing a DC offset correction value to the DC offset correction value storing unit 60, the output of the signal level detecting unit 30 may be used as the first dimension write address and the output of the subtractor 63 as the second dimension write address. By using such write addresses, the DC offset correction value estimated by the DC offset correction value estimating unit 20 is written to a different address if either the signal level of the input signal or the amount of change of the signal level with time is different.

In this configuration, when an input signal having a signal level corresponding to the first dimension address and an amount of change with time corresponding to the second dimension address is quadrature-modulated, the DC offset correction value output from the DC offset correction value estimating unit 20 can be stored in the DC offset correction value storing unit 60 at an address expressed by the first and second dimension addresses. Delay elements 64 and 65 are provided to delay the first and second dimension addresses by an amount of time that elapses from the moment that the input signal is quadrature-modulated until the DC offset correction value is output from the DC offset correction value estimating unit 20.

Figure 32:
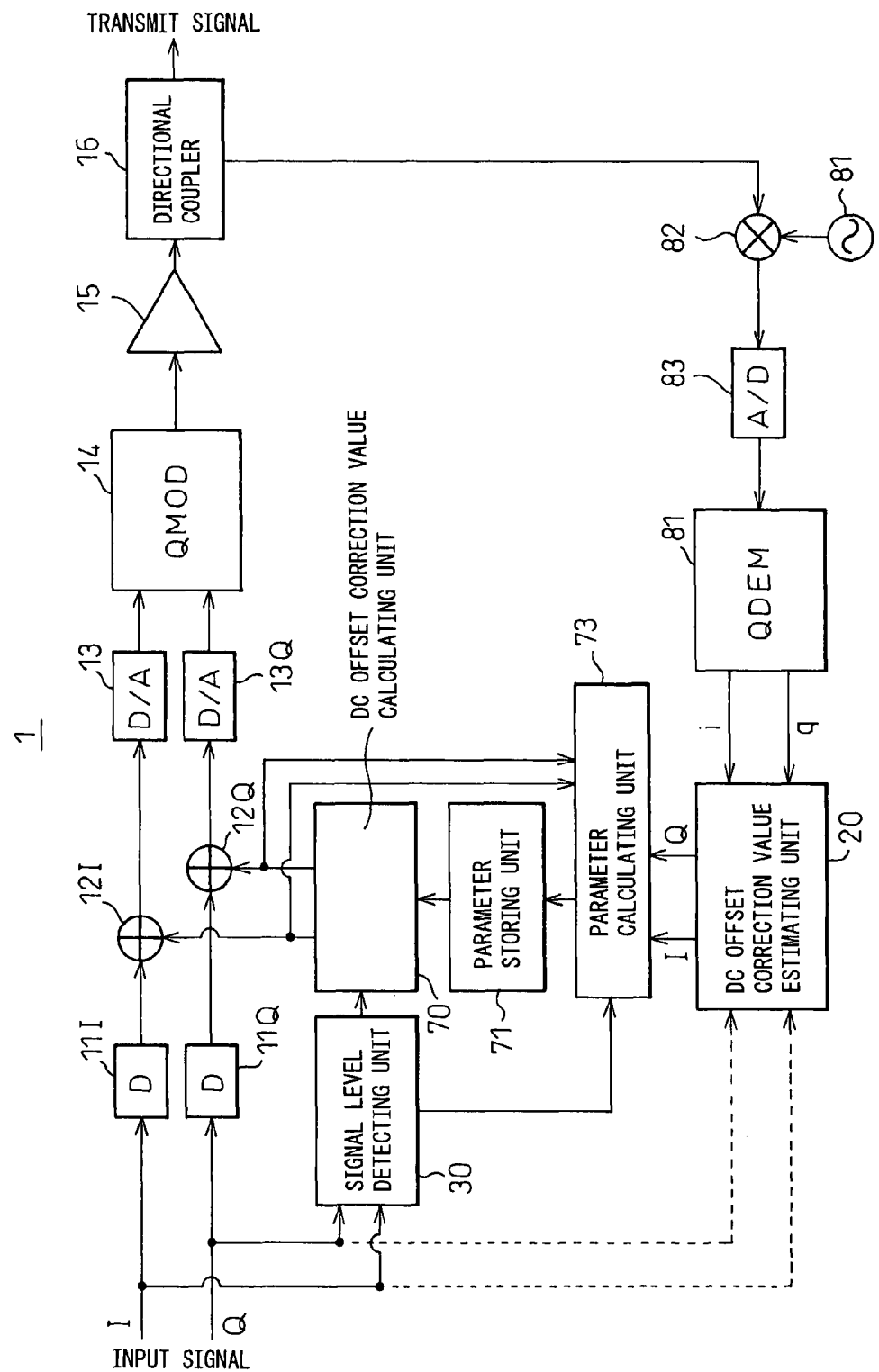
FIG. 32 is a diagram schematically showing the configuration of a quadrature modulation system according to a 12th embodiment of the present invention.

FIG. 32 is a diagram schematically showing the configuration of a quadrature modulation system according to a 12th embodiment of the present invention. In this embodiment, an approximation equation is determined which is used to calculate from each signal level of the input signal the DC offset correction value corresponding to that signal level and, using this approximation equation, the DC offset correction value that matches the signal level of the input signal is calculated, and the DC offset is compensated for by using the thus calculated DC offset correction value.

For this purpose, the quadrature modulation system 1 includes: a DC offset correction value calculating unit 70 for calculating the DC offset correction value in accordance with each signal level of the input signal by using a prescribed approximation equation; a parameter storing unit 71 for storing parameters for defining the prescribed approximation equation; and a parameter calculating unit 73 for calculating the parameters defining the approximation equation from the DC offset correction value output from the DC offset correction value estimating unit 20.

The approximation equation may, for example, be a polynomial with the signal level of the input signal as the variable, and the parameters may be the coefficients by which the terms contained in the polynomial are respectively multiplied. In this case, the DC offset correction value calculating unit 70 calculates the DC offset correction value in accordance with the signal level of the input signal by using the polynomial.

The parameter calculating unit 73 calculates the parameters using, for example, a least square method, based on the respective signal levels of a plurality of input signals and on the DC offset correction values that the DC offset correction value estimating unit 20 estimates from the respective transmit signals when the input signals of the respective signal levels are respectively quadrature-modulated.

While the DC offset compensation method and DC offset compensation device according to the present invention can be advantageously used to compensate for a DC offset that is added to a transmit signal in an analog quadrature modulation system used in high-speed communications such as IMT2000, the present invention is not limited to this particular application, but can be widely used for quadrature modulation systems that use two carriers in phase quadrature and produce a transmit signal by modulating the two carriers in accordance with an input signal comprising an in-phase component signal and a quadrature component signal.

What is claimed is:

1. A DC offset compensation method used in a transmitter for compensating for a component which is contained in a transmit signal produced by modulating two quadrature carriers in accordance with an input signal to be transmitted by said transmitter comprising an in-phase component signal and a quadrature component signal and derived from DC offset contained in said in-phase component signal and said quadrature component signal, said compensation being performed using a DC offset correction value obtained from said transmit signal, wherein:
   generating a DC offset correction value based on the transmit signal;
   detecting signal levels of the input signal to be transmitted by the transmitter;
   weighting the DC offset correction value by multiplying the DC offset correction by a weighting factor reflecting an effect of a variation of detected input signal levels of the input signal to be transmitted by said transmitter on DC offset components; and
   compensating the DC offset components using the weighted DC offset correction value.

2. The DC offset compensation method as claimed in claim 1, wherein said DC offset correction value is weighted in accordance with an average value obtained by averaging the signal level of said input signal over a prescribed period.

3. The DC offset compensation method as claimed in claim 1, wherein said DC offset correction value is weighted in accordance with an average value obtained by averaging a weighting factor that matches the signal level of said input signal over a prescribed period.

4. The DC offset compensation method as claimed in claim 1, wherein said DC offset correction value is weighted for an amplitude component and/or a phase component of said DC offset component.

5. The DC offset compensation method as claimed in claim 1, wherein
   a weighting factor to be applied to said DC offset correction value is stored, and
   said DC offset correction value is weighed in accordance with said stored weighting factor.

6. The DC offset compensation method as claimed in claim 5, wherein
   an offset amount is measured for said DC offset component contained in said transmit signal, and
   said stored weighting factor is updated so as to minimize said offset amount.

7. The DC offset compensation method as claimed in claim 1, wherein
a weighting factor to be applied to said DC offset correction value is set and stored in advance for each signal level of said input signal, and
said DC offset correction value is weighted in accordance with said set weighting factor.

8. The DC offset compensation method as claimed in claim 7, wherein
an offset amount is measured for said component contained in said transmit signal modulated when arbitrary transmit data is input as said input signal,
an offset amount is measured for said component contained in said transmit signal modulated when a training signal of a signal level corresponding to said each signal level is input as said input signal, and
the weighting factor to be applied to said DC offset correction value is calculated for each signal level of said input signal, based on the difference between the offset amount for said arbitrary transmit data and the offset amount for said training signal of said each signal level.

9. The DC offset compensation method as claimed in claim 1, wherein each weighting factor to be applied to said DC offset correction value is adjusted in accordance with the frequency of said input signal.

10. The DC offset compensation method as claimed in claim 1, wherein each weighting factor to be applied to said DC offset correction value is adjusted in accordance with an ambient temperature at which the modulation is performed.

11. The DC offset compensation method as claimed in claim 1, wherein each weighting factor to be applied to said DC offset correction value is adjusted in accordance with the number of carriers forming said input signal.

12. The DC offset compensation method as claimed in claim 1, wherein said DC offset correction value is weighted in proportion to the signal level of said input signal.

13. A DC offset compensation device used in quadrature modulation which produces a transmit signal in a transmitter by modulating two quadrature carriers in accordance with an input signal to be transmitted by said transmitter comprising an in-phase component signal and a quadrature component signal, for compensating for a component which is contained in said transmit signal and derived from DC offset contained in said in-phase component signal and said quadrature component signal by using a DC offset correction value obtained from said transmit signal, comprising:
a DC offset generating unit which generates a DC offset correction value based on the transmit signal;
a signal level detecting unit which detects signal level of said input signal to be transmitted by said transmitter;
a weighting unit which weights said DC offset correction value by multiplying the DC offset correction by a weighting factor reflecting an effect of a variation of detected input signal levels of the input signal to be transmitted by said transmitter on DC offset components; and
a compensating unit which compensates the DC offset components using the weighted DC offset correction value.

14. The DC offset compensation device as claimed in claim 13, further comprising a signal level averaging unit which calculates an average value by averaging the signal level of said input signal over a prescribed period, wherein
said weighting factor calculating unit calculates said weighting factor in accordance with said average value.

15. The DC offset compensation device as claimed in claim 13, further comprising a weighting factor averaging unit which calculates an average value by averaging said weighting factor over a prescribed period, wherein
said weighting unit weights said DC offset correction value in accordance with said average value.

16. The DC offset compensation device as claimed in claim 13, wherein said weighting factor is a weighting factor to be applied to said DC offset correction value with respect to an amplitude component and/or a phase component of said DC offset component.

17. The DC offset compensation device as claimed in claim 13, further comprising a weighting factor storing unit which stores each weighting factor to be applied to said DC offset correction value, wherein
said weighting unit weights said DC offset correction value in accordance with said stored weighting factor.

18. The DC offset compensation device as claimed in claim 17, further comprising:
an offset amount measuring unit which measures from said transmit signal an offset amount for the DC offset component contained in said transmit signal; and
a weighting factor updating unit which minimizes said measured offset amount by updating said weighting factor stored for said DC offset correction value.

19. The DC offset compensation device as claimed in claim 17, further comprising:
a weighting factor setting unit which sets each weighting factor to be applied to said DC offset correction value for each signal level of said input signal, wherein
said weighting factor storing unit stores said each weighting factor preset by said weighting factor setting unit.

20. The DC offset compensation device as claimed in claim 19, further comprising:
an offset amount measuring unit which measures from said transmit signal an offset amount for the component contained in said transmit signal, wherein
said weighting factor calculating unit calculates said each weighting factor based on the difference between the offset amount of the component measured in said transmit signal modulated when arbitrary transmit data is input as said input signal and the offset amount of the component measured in said transmit signal modulated when a training signal of a signal level corresponding to said each signal level is input as said input signal.

21. The DC offset compensation device as claimed in claim 13, wherein said weighting factor calculating unit adjusts each weighting factor to be applied to said DC offset correction value in accordance with the frequency of said input signal.

22. The DC offset compensation device as claimed in claim 13, wherein said weighting factor calculating unit adjusts each weighting factor to be applied to said DC offset correction value in accordance with an ambient temperature at which said quadrature modulation is performed.

23. The DC offset compensation device as claimed in claim 13, wherein said weighting factor calculating unit adjusts each weighting factor to be applied to said DC offset correction value in accordance with the number of carriers forming said input signal.

24. The DC offset compensation device as claimed in claim 13, wherein said weighting factor calculating unit calculates said weighting factor in proportion to the signal level of said input signal.

25. A DC offset compensation method used in a transmitter for compensating for an offset component, which is contained in a transmit signal produced by modulating two quadrature carriers in accordance with an input signal to be transmitted by said transmitter comprising an in-phase component signal and a quadrature component signal and derived from DC offset contained in the in-phase component signal and the quadrature component signal, the DC offset compensation method comprising:
- generating a DC offset correction value based on the input signal to be transmitted by said transmitter and the output signal; and
- compensating the offset component based on the DC offset correction value which is multiplied by a weighting factor reflecting an effect of a variation of an input signal level of the input signal to be transmitted by said transmitter on the offset component.

* * * * *